US012179051B2

(12) United States Patent
Weinbrenner et al.

(10) Patent No.: US 12,179,051 B2
(45) Date of Patent: Dec. 31, 2024

(54) FIRE DETECTION SYSTEM WITH A LEARNING MODE

(71) Applicant: Tyco Fire Products LP, Lansdale, PA (US)

(72) Inventors: Eric S. Weinbrenner, Suamico, WI (US); Derek M. Sandahl, Wallace, MI (US); Jamie T. Weinert, Escanaba, MI (US); Anthony P. Moffa, Northborough, MA (US); Gene Vena, Jackson, WI (US)

(73) Assignee: Tyco Fire Products LP, Cranston, RI (US)

( * ) Notice: Subject to any disclaimer, the term of this patent is extended or adjusted under 35 U.S.C. 154(b) by 404 days.

(21) Appl. No.: 17/612,404

(22) PCT Filed: May 21, 2020

(86) PCT No.: PCT/IB2020/054849
§ 371 (c)(1),
(2) Date: Nov. 18, 2021

(87) PCT Pub. No.: WO2020/234826
PCT Pub. Date: Nov. 26, 2020

(65) Prior Publication Data

US 2022/0249892 A1 Aug. 11, 2022

Related U.S. Application Data

(60) Provisional application No. 62/851,196, filed on May 22, 2019.

(51) Int. Cl.
*A62C 37/40* (2006.01)
*A62C 3/00* (2006.01)

(52) U.S. Cl.
CPC .............. *A62C 37/40* (2013.01); *A62C 3/006* (2013.01)

(58) Field of Classification Search
CPC ................................ A62C 37/40; A62C 3/006
(Continued)

(56) References Cited

U.S. PATENT DOCUMENTS 5,691,703 A 11/1997 Roby et al.
7,170,418 B2 * 1/2007 Rose-Pehrsson ...... G08B 17/00 340/540
(Continued)

FOREIGN PATENT DOCUMENTS

EP 2 727 631 A1 5/2014
EP 2 879 105 A1 6/2015
(Continued)

OTHER PUBLICATIONS

International Search Report and Written Opinion, Korean Intellectual Property Office, for PCT Appl. Ser. No. PCT/IB2023/055988 dated Oct. 4, 2023 (10 pages).
(Continued)

*Primary Examiner* — Steven J Ganey
(74) *Attorney, Agent, or Firm* — Foley & Lardner LLP

(57) ABSTRACT

A fire detection and suppression system includes a fire suppression system configured to suppress a fire, an ambient temperature sensor, one or more temperature sensors, and a controller. The ambient temperature sensor measures an ambient temperature. The one or more temperature sensors are configured to measure a hazard temperature. The controller is configured to receive ambient temperature readings from the ambient temperature sensor and hazard temperature readings from the one or more temperature sensors over a learning time period. The controller is configured to determine one or more characteristic values based on the received
(Continued)

ambient temperature readings and the hazard temperature readings over the learning time period. The controller is configured to use the one or more characteristic values to detect a fire condition. The controller is configured to activate the fire suppression system in response to detecting the fire condition.

20 Claims, 8 Drawing Sheets

(58) Field of Classification Search
USPC .......................................................... 169/61, 65
See application file for complete search history.

(56) References Cited

U.S. PATENT DOCUMENTS

| | | | | |
|---|---|---|---|---|
| 9,990,842 | B2 * | 6/2018 | Zribi | G08B 29/185 |
| 2008/0141996 | A1 | 6/2008 | Erdmann | |
| 2013/0048319 | A1 * | 2/2013 | Glaub | B01D 47/06 169/65 |
| 2015/0136430 | A1 * | 5/2015 | Livchak | F24C 15/2021 169/61 |
| 2015/0348400 | A1 | 12/2015 | Zribi et al. | |
| 2017/0246487 | A1 | 8/2017 | Livchak et al. | |
| 2018/0229173 | A1 | 8/2018 | Weinbrenner | |
| 2019/0054333 | A1 | 2/2019 | McNamara et al. | |
| 2020/0054905 | A1 | 2/2020 | Livchak et al. | |
| 2021/0370111 | A1 | 12/2021 | Diaz et al. | |

FOREIGN PATENT DOCUMENTS

| | | | |
|---|---|---|---|
| EP | 2 879 105 | B1 | 6/2015 |
| KR | 10-0721881 | B1 | 5/2007 |
| KR | 20160004022 | A | 12/2016 |
| KR | 1020160004022 | A | 12/2016 |
| KR | 101713232 | B1 | 3/2017 |
| WO | WO-2020/148625 | A1 | 7/2020 |

OTHER PUBLICATIONS

International Search Report and Written Opinion on International Application No. PCT/IB2020/054849, mail date Aug. 11, 2020, 11 pages.

* cited by examiner

FIRE DETECTION SYSTEM WITH A LEARNING MODE

CROSS-REFERENCE TO RELATED PATENT APPLICATION

This application claims the benefit of and priority to U.S. Provisional Application No. 62/851,196, filed May 22, 2019, the entire disclosure of which is incorporated by reference herein.

BACKGROUND

Fire suppression systems are commonly used to protect an area and objects within the area from fire. Fire suppression systems can be activated manually or automatically in response to an indication that a fire is present nearby (e.g., an increase in ambient temperature beyond a predetermined threshold value, etc.). Once activated, fire suppression systems spread a fire suppression agent throughout the area. The fire suppressant agent then extinguishes or prevents the growth of the fire.

SUMMARY

One implementation of the present disclosure is a fire detection and suppression system, according to some embodiments. In some embodiments, the fire detection and suppression system includes a fire suppression system configured to suppress a fire, an ambient temperature sensor, one or more temperature sensors, and a controller. In some embodiments, the ambient temperature sensor is configured to measure an ambient temperature. In some embodiments, the one or more temperature sensors are configured to measure a hazard temperature associated with a hazard area. In some embodiments, the controller is configured to receive ambient temperature readings from the ambient temperature sensor and hazard temperature readings from the one or more temperature sensors over a learning time period. In some embodiments, the controller is configured to determine one or more characteristic values based on the received ambient temperature readings and the hazard temperature readings over the learning time period. In some embodiments, the controller is configured to use the one or more characteristic values to detect a fire condition. In some embodiments, the controller is configured to activate the fire suppression system in response to detecting the fire condition.

In some embodiments, the one or more characteristic values include at least one of a characteristic ambient temperature, a characteristic hazard temperature, a characteristic rise rate of the hazard temperature, or a characteristic temperature differential between the ambient temperature and the hazard temperature.

In some embodiments, the one or more characteristic values are average values.

In some embodiments, the controller is further configured to compare at least one of the one or more characteristic values to a corresponding current value to detect the fire condition.

In some embodiments, the controller is further configured to determine a likelihood of a fire condition occurring at a near future time based on the comparison of at least one of the one or more characteristic values to the corresponding current values.

In some embodiments, the system further includes a human machine interface configured to receive one or more input parameters.

In some embodiments, the controller is further configured to use the one or more input parameters to determine the learning time period.

In some embodiments, the controller is further configured to at cause an alert device to display an alert in response to detecting the fire condition.

In some embodiments, the controller is further configured to store the one or more characteristic values for a later usage.

In some embodiments, the one or more characteristic values are specific to an application of the system.

In some embodiments, the controller is further configured to provide at least one of the one or more characteristic values to a remote device.

Another implementation of the present disclosure is a method for determining and using one or more characteristic application parameters of a fire suppression system, according to some embodiments. In some embodiments, the method includes receiving ambient temperature readings from an ambient temperature sensor and hazard temperature readings associated with a hazard area from one or more temperature sensors over a learning time period. In some embodiments, the method includes determining one or more characteristic values based on the received ambient temperature readings and the hazard temperature readings over the learning time period. In some embodiments, the method includes using the one or more characteristic values to detect a hazard. In some embodiments, the method includes activating the fire suppression system in response to detecting the fire condition.

In some embodiments, the one or more characteristic values include at least one of a characteristic ambient temperature, a characteristic hazard temperature, a characteristic rise rate of the hazard temperature, or a characteristic temperature differential between the ambient temperature and the hazard temperature.

In some embodiments, the method includes comparing at least one of the one or more characteristic values to a corresponding current value to detect a fire condition.

In some embodiments, the method includes determining a likelihood of a fire condition occurring at a near future time based on the comparison of at least one of the one or more characteristic values and the corresponding current values.

In some embodiments, the method includes receiving one or more input parameters from a user and determining the learning time period based on the one or more input parameters.

Another implementation of the present disclosure is a controller for a fire suppression system of a hazard area, according to some embodiments. In some embodiments, the controller includes processing circuitry configured to receive multiple temperature readings from a temperature sensor over a learning time period. In some embodiments, the processing circuitry is configured to determine one or more characteristic values based on the received temperature readings obtained over the learning time period. In some embodiments, the processing circuitry is configured to receive one or more temperature readings from the temperature sensor over an operational time period after the learning time period. In some embodiments, the processing circuitry is configured to compare the one or more temperature readings obtained from the temperature sensor over the operational time period to the one or more characteristic values to detect a fire condition at the hazard area. In some embodiments, the processing circuitry is configured to activate the fire suppression system in response to detecting the fire condition at the hazard area.

In some embodiments, the one or more characteristic values include at least one of an average cooking temperature, an average ambient temperature, an average temperature differential, or an average rise rate.

In some embodiments, the controller uses Boolean logic to detect the fire condition and activate the fire suppression system.

In some embodiments, the controller is configured to wirelessly communicate with a remote device and receive an update from the remote device, wherein the update includes any of an update to one or more parameters used to detect the fire, or the one or more characteristic values.

DETAILED DESCRIPTION

Figure 1:
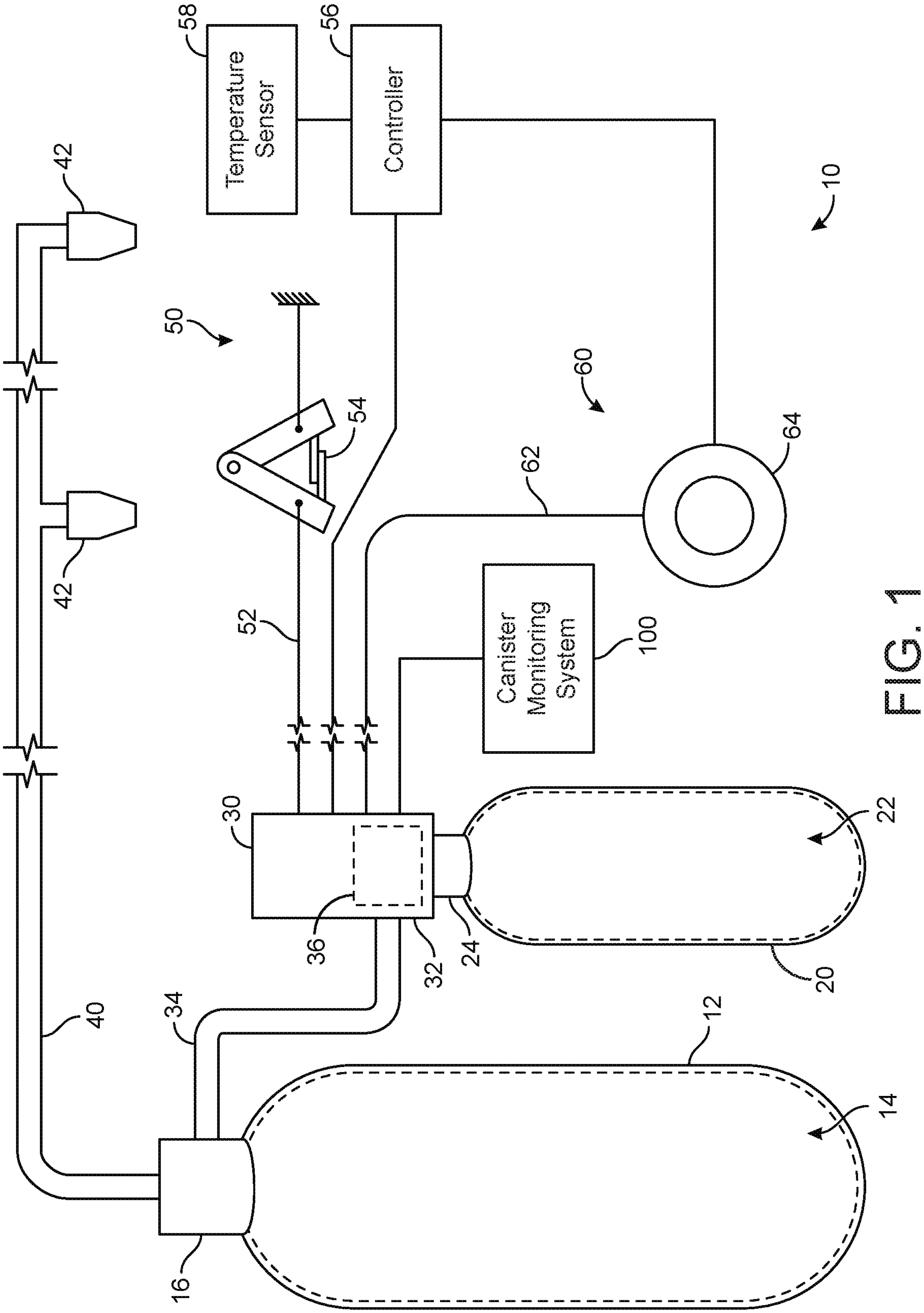
FIG. 1 is a schematic of a fire suppression system, according to some embodiments.

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Referring generally to the FIGURES, a fire detection and suppression system is shown, according to some embodiments. The system includes an ambient temperature sensor configured to measure ambient temperature, one or more temperature sensors configured to monitor a control temperature (e.g., a hood temperature, a hazard temperature of a hazard area, etc.), and a controller, according to some embodiments. In some embodiments, the controller is configured to transition into a learning mode in response to a user input. In some embodiments, when in the learning mode, the controller periodically receives ambient temperature readings and control temperature readings over a learning time period. In some embodiments, the learning time period is determined based on one or more input parameters. In some embodiments, the controller is configured to collect the ambient temperature readings and the control temperature readings over the learning time period and determine one or more characteristic values based on the collected temperature readings. In some embodiments, the one or more characteristic values include an average rise rate, an average control temperature, an average temperature differential, and an average ambient temperature. In some embodiments, the controller is configured to use the one or more characteristic values to detect fire hazards during an application of the system. In some embodiments, the fire detection and suppression system is a system for a cooker, a fryer, etc., or any other kitchen application. In some embodiments, the fire detection and suppression system is an automotive system, a building system, etc. In some embodiments, the control temperature is an exhaust hood temperature. In some embodiments, the controller is configured to store the one or more characteristic values for use at a later time. In some embodiments, the controller is configured to provide the one or more characteristic values to a remote device (e.g., a smart phone). In some embodiments, the controller is configured to provide real-time temperature readings of the ambient temperature sensor and/or the one or more temperature sensors to a remote device. In some embodiments, the controller includes a Human Machine Interface (HMI) for receiving one or more inputs from a user to determine the input parameters, or for displaying alerts, or for displaying the one or more characteristic values. In some embodiments, the controller is configured to activate a fire suppression system in response to detecting a fire hazard.

Advantageously, using the fire detection and suppression system as shown in the FIGURES and described in the accompanying description reduces the need for a fusible link to detect a fire hazard and activate a fire suppression system, according to some embodiments. Additionally, the fire detection and suppression system may be configured to identify characteristic values which are unique to the implementation of the fire detection and suppression system. The fire detection and suppression system may be used to determine characteristic operational values of a system, and to provide a more accurate fire hazard detection. In some embodiments, the fire detection and suppression system provides a faster fire hazard detection and fire suppression system activation than other systems which use a fusible link. Various embodiments disclosed herein relate to a fire suppression system which can be tailored to the unique or specific application and determine one or more characteristic values of the unique application for fire detection.

Fire Suppression System

Referring to FIG. 1, a fire suppression system 10 is shown according to an exemplary embodiment. In one embodiment, the fire suppression system 10 is a chemical fire suppression system. The fire suppression system 10 is configured to dispense or distribute a fire suppressant agent onto and/or nearby a fire, suppressing/extinguishing the fire and preventing the fire from spreading. The fire suppression system 10 can be used alone or in combination with other types of fire suppression systems (e.g., a building sprinkler system, a handheld fire extinguisher, etc.). In some embodiments, multiple fire suppression systems 10 are used in combination with one another to cover a larger area (e.g., each in different rooms of a building).

The fire suppression system 10 can be used in a variety of different applications. Different applications can require different types of fire suppressant agent and different levels of mobility. The fire suppression system 10 is usable with a variety of different fire suppressant agents, such as powders, liquids, foams, or other fluid or flowable materials. The fire suppression system 10 can be used in a variety of stationary applications. By way of example, the fire suppression system 10 is usable in kitchens (e.g., for oil or grease fires, etc.), in libraries, in data centers (e.g., for electronics fires, etc.), at filling stations (e.g., for gasoline or propane fires, etc.), or in other stationary applications. Alternatively, the fire suppression system 10 can be used in a variety of mobile applications. By way of example, the fire suppression system 10 can be incorporated into land-based vehicles (e.g., racing vehicles, forestry vehicles, construction vehicles, agricultural vehicles, mining vehicles, passenger vehicles, refuse vehicles, etc.), airborne vehicles (e.g., jets, planes, helicopters, etc.), or aquatic vehicles, (e.g., ships, submarines, etc.).

Referring again to FIG. 1, the fire suppression system 10 includes a fire suppressant tank 12 (e.g., a vessel, container, vat, drum, tank, canister, cartridge, or can, etc.). The fire suppressant tank 12 defines an internal volume 14 filled (e.g., partially, completely, etc.) with fire suppressant agent. In some embodiments, the fire suppressant agent is normally not pressurized (e.g., is near atmospheric pressure). The fire suppressant tank 12 includes an exchange section, shown as neck 16. The neck 16 permits the flow of expellant gas into the internal volume 14 and the flow of fire suppressant agent out of the internal volume 14 so that the fire suppressant agent can be supplied to a fire.

The fire suppression system 10 further includes a cartridge 20 (e.g., a vessel, container, vat, drum, tank, canister, cartridge, or can, etc.). The cartridge 20 defines an internal volume 22 configured to contain a volume of pressurized expellant gas. The expellant gas can be an inert gas. In some embodiments, the expellant gas is air, carbon dioxide, or nitrogen. The cartridge 20 includes an outlet portion or outlet section, shown as neck 24. The neck 24 defines an outlet fluidly coupled to the internal volume 22. Accordingly, the expellant gas can leave the cartridge 20 through the neck 24. The cartridge 20 can be rechargeable or disposable after use. In some embodiments where the cartridge 20 is rechargeable, additional expellant gas can be supplied to the internal volume 22 through the neck 24.

The fire suppression system 10 further includes a valve, puncture device, or activator assembly, shown as actuator 30. The actuator 30 includes an adapter, shown as receiver 32, that is configured to receive the neck 24 of the cartridge 20. The neck 24 is selectively coupled to the receiver 32 (e.g., through a threaded connection, etc.). Decoupling the cartridge 20 from the actuator 30 facilitates removal and replacement of the cartridge 20 when the cartridge 20 is depleted. The actuator 30 is fluidly coupled to the neck 16 of the fire suppressant tank 12 through a conduit or pipe, shown as hose 34.

The actuator 30 includes an activation mechanism 36 configured to selectively fluidly couple the internal volume 22 to the neck 16. In some embodiments, the activation mechanism 36 includes one or more valves that selectively fluidly couple the internal volume 22 to the hose 34. The valves can be mechanically, electrically, manually, or otherwise actuated. In some such embodiments, the neck 24 includes a valve that selectively prevents the expellant gas from flowing through the neck 24. Such a valve can be manually operated (e.g., by a lever or knob on the outside of the cartridge 20, etc.) or can open automatically upon engagement of the neck 24 with the actuator 30. Such a valve facilitates removal of the cartridge 20 prior to depletion of the expellant gas. In other embodiments, the cartridge 20 is sealed, and the activation mechanism 36 includes a pin, knife, nail, or other sharp object that the actuator 30 forces into contact with the cartridge 20. This punctures the outer surface of the cartridge 20, fluidly coupling the internal volume 22 with the actuator 30. In some embodiments, the activation mechanism 36 punctures the cartridge 20 only when the actuator 30 is activated. In some such embodiments, the activation mechanism 36 omits any valves that control the flow of expellant gas to the hose 34. In other embodiments, the activation mechanism 36 automatically punctures the cartridge 20 as the neck 24 engages the actuator 30.

Once the actuator 30 is activated and the cartridge 20 is fluidly coupled to the hose 34, the expellant gas from the cartridge 20 flows freely through the neck 24, the actuator 30, and the hose 34 and into the neck 16. The expellant gas forces fire suppressant agent from the fire suppressant tank 12 out through the neck 16 and into a conduit or hose, shown as pipe 40. In one embodiment, the neck 16 directs the expellant gas from the hose 34 to a top portion of the internal volume 14. The neck 16 defines an outlet (e.g., using a syphon tube, etc.) near the bottom of the fire suppressant tank 12. The pressure of the expellant gas at the top of the internal volume 14 forces the fire suppressant agent to exit through the outlet and into the pipe 40. In other embodiments, the expellant gas enters a bladder within the fire suppressant tank 12, and the bladder presses against the fire suppressant agent to force the fire suppressant agent out through the neck 16. In yet other embodiments, the pipe 40 and the hose 34 are coupled to the fire suppressant tank 12 at different locations. By way of example, the hose 34 can be coupled to the top of the fire suppressant tank 12, and the pipe 40 can be coupled to the bottom of the fire suppressant tank 12. In some embodiments, the fire suppressant tank 12 includes a burst disk that prevents the fire suppressant agent from flowing out through the neck 16 until the pressure within the internal volume 14 exceeds a threshold pressure. Once the pressure exceeds the threshold pressure, the burst disk ruptures, permitting the flow of fire suppressant agent. Alternatively, the fire suppressant tank 12 can include a valve, a puncture device, or another type of opening device or activator assembly that is configured to fluidly couple the internal volume 14 to the pipe 40 in response to the pressure within the internal volume 14 exceeding the threshold pressure. Such an opening device can be configured to activate mechanically (e.g., the force of the pressure causes the opening device to activate, etc.) or the opening device may include a separate pressure sensor in communication with the internal volume 14 that causes the opening device to activate.

The pipe 40 is fluidly coupled to one or more outlets or sprayers, shown as nozzles 42. The fire suppressant agent flows through the pipe 40 and to the nozzles 42. The nozzles 42 each define one or more apertures, through which the fire suppressant agent exits, forming a spray of fire suppressant agent that covers a desired area. The sprays from the nozzles 42 then suppress or extinguish fire within that area. The apertures of the nozzles 42 can be shaped to control the spray pattern of the fire suppressant agent leaving the nozzles 42. The nozzles 42 can be aimed such that the sprays cover specific points of interest (e.g., a specific piece of restaurant equipment, a specific component within an engine compartment of a vehicle, etc.). The nozzles 42 can be configured such that all of the nozzles 42 activate simultaneously, or the nozzles 42 can be configured such that only the nozzles 42 near the fire are activated.

The fire suppression system 10 further includes an automatic activation system 50 that controls the activation of the actuator 30. The automatic activation system 50 is configured to monitor one or more conditions and determine if those conditions are indicative of a nearby fire. Upon detecting a nearby fire, the automatic activation system 50 activates the actuator 30, causing the fire suppressant agent to leave the nozzles 42 and extinguish the fire.

In some embodiments, the actuator 30 is controlled mechanically. As shown in FIG. 1, the automatic activation system 50 includes a mechanical system including a tensile member (e.g., a rope, a cable, etc.), shown as cable 52, that imparts a tensile force on the actuator 30. Without this tensile force, the actuator 30 will activate. The cable 52 is coupled to a fusible link 54, which is in turn coupled to a stationary object (e.g., a wall, the ground, etc.). The fusible link 54 includes two plates that are held together with a solder alloy having a predetermined melting point. A first plate is coupled to the cable 52, and a second plate is coupled to the stationary object. When the ambient temperature surrounding the fusible link 54 exceeds the melting point of the solder alloy, the solder melts, allowing the two plates to separate. This releases the tension on the cable 52, and the actuator 30 activates. In other embodiments, the automatic activation system 50 is another type of mechanical system that imparts a force on the actuator 30 to activate the actuator 30. The automatic activation system 50 can include linkages, motors, hydraulic or pneumatic components (e.g., pumps, compressors, valves, cylinders, hoses, etc.), or other types of mechanical components configured to activate the actuator 30. Some parts of the automatic activation system 50 (e.g., a compressor, hoses, valves, and other pneumatic components, etc.) can be shared with other parts of the fire suppression system 100 (e.g., the manual activation system 60) or vice versa.

The actuator 30 can additionally or alternatively be configured to activate in response to receiving an electrical signal from the automatic activation system 50. Referring to FIG. 1, the automatic activation system 50 includes a controller 56 that monitors signals from one or more sensors, shown as temperature sensor 58 (e.g., thermocouples, resistance temperature detectors, etc.). The controller 56 can use the signals from the temperature sensor 58 to determine if an ambient temperature has exceeded a threshold temperature. Upon determining that the ambient temperature has exceeded the threshold temperature, the controller 56 provides an electrical signal to the actuator 30. The actuator 30 then activates in response to receiving the electrical signal.

The fire suppression system 10 further includes a manual activation system 60 that controls the activation of the actuator 30. The manual activation system 60 is configured to activate the actuator 30 in response to an input from an operator. The manual activation system 60 can be included instead of or in addition to the automatic activation system 50. Both the automatic activation system 50 and the manual activation system 60 can activate the actuator 30 independently. By way of example, the automatic activation system 50 can activate the actuator 30 regardless of any input from the manual activation system 60, and vice versa.

As shown in FIG. 1, the manual activation system 60 includes a mechanical system including a tensile member (e.g., a rope, a cable, etc.), shown as cable 62, coupled to the actuator 30. The cable 62 is coupled to a human interface device (e.g., a button, a lever, a switch, a knob, a pull ring, etc.), shown as button 64. The button 64 is configured to impart a tensile force on the cable 62 when pressed, and this tensile force is transferred to the actuator 30. The actuator 30 activates upon experiencing the tensile force. In other embodiments, the manual activation system 60 is another type of mechanical system that imparts a force on the actuator 30 to activate the actuator 30. The manual activation system 60 can include linkages, motors, hydraulic or pneumatic components (e.g., pumps, compressors, valves, cylinders, hoses, etc.), or other types of mechanical components configured to activate the actuator 30.

The actuator 30 can additionally or alternatively be configured to activate in response to receiving an electrical signal from the manual activation system 60. As shown in FIG. 1, the button 64 is operably coupled to the controller 56. The controller 56 can be configured to monitor the status of a human interface device (e.g., engaged, disengaged, etc.). Upon determining that the human interface device is engaged, the controller provides an electrical signal to activate the actuator 30. By way of example, the controller 56 can be configured to monitor a signal from the button 64 to determine if the button 64 is pressed. Upon detecting that the button 64 has been pressed, the controller 56 sends an electrical signal to the actuator 30 to activate the actuator 30.

The automatic activation system 50 and the manual activation system 60 are shown to activate the actuator 30 both mechanically (e.g., though application of a tensile force through cables, through application of a pressurized liquid, through application of a pressurized gas, etc.) and electrically (e.g., by providing an electrical signal). It should be understood, however, that the automatic activation system 50 and/or the manual activation system 60 can be configured to activate the actuator 30 solely mechanically, solely electrically, or through some combination of both. By way of example, the automatic activation system 50 can omit the controller 56 and activate the actuator 30 based on the input from the fusible link 54. By way of another example, the automatic activation system 50 can omit the fusible link 54 and activate the actuator 30 using an input from the controller 56.

Fire Detection and Alert System

System Overview

Figure 2:
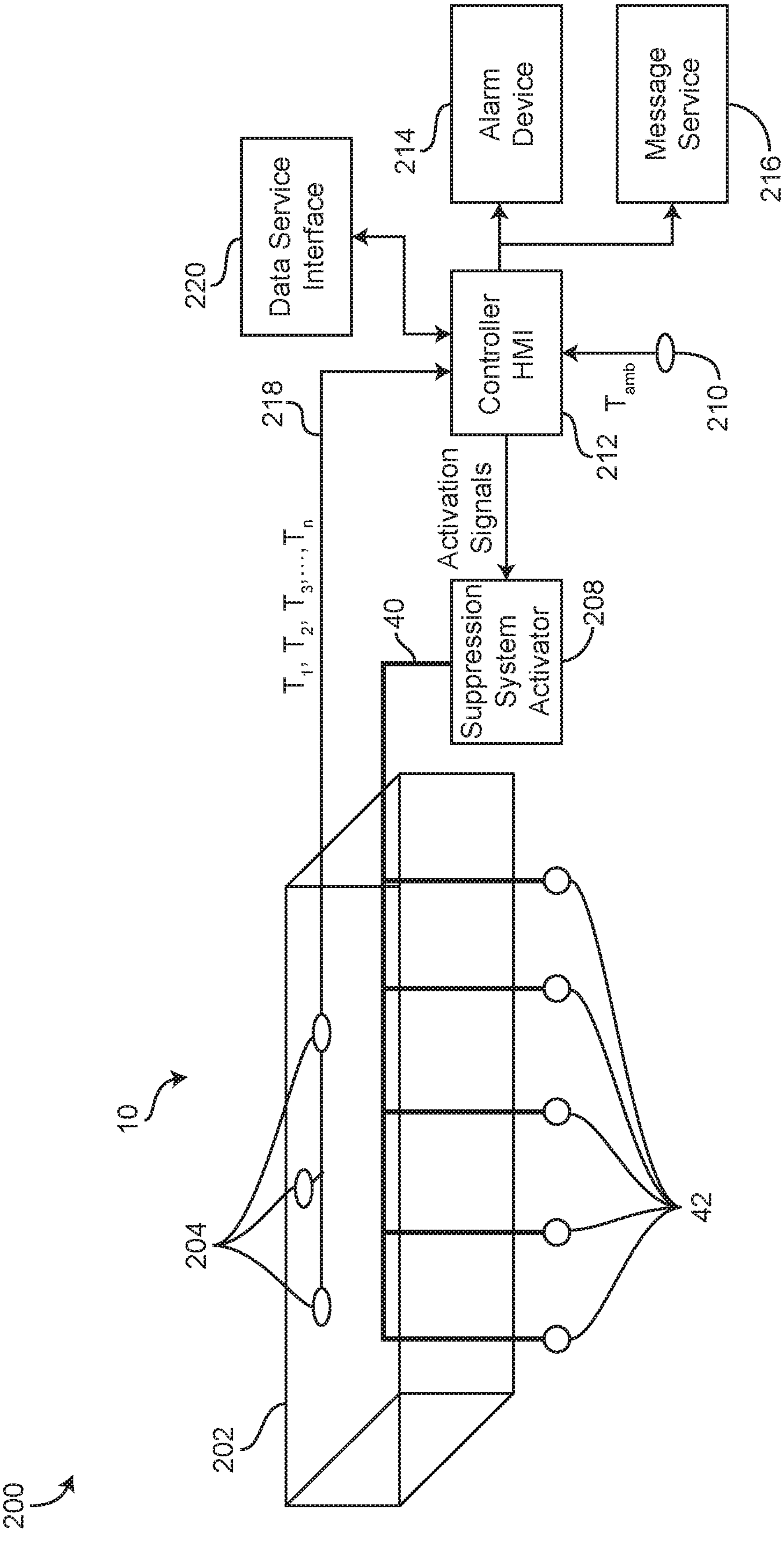
FIG. 2 is a block diagram showing a fire detection and suppression system, including a controller, according to some embodiments.

Referring now to FIG. 2, a fire detection and alert system 200 is shown, according to an exemplary embodiment. In some embodiments, fire detection and alert system 200 is or includes automatic activation system 50. In some embodiments, fire detection and alert system 200 is configured to cause automatic activation system 50 to activate fire suppression system 10 in response to detecting a fire. In some embodiments, fire detection and alert system 200 includes all of the functionality of automatic activation system 50. In some embodiments, fire detection and alert system 200 replaces automatic activation system 50 and is configured to cause actuator 30 and/or activation mechanism 36 to allow fluid to flow out of fire suppressant tank 12 and/or cartridge 20. In some embodiments, fire detection and alert system 200 is configured to activate fire suppression system 10 such that the expellant gas exits internal volume 22 of cartridge 20 through neck 24 and the fire suppressant exits internal volume 14 of fire suppressant tank 12 through neck 16. Fire detection and alert system 200 includes fire suppression system 10, suppression system activator 208, controller 212, alarm device 214, and messaging service 216, according to some embodiments. Fire detection and alert system 200 is configured to monitor various temperature readings from temperature sensors 204 to detect fires, according to some embodiments. Advantageously, fire detection and alert system 200 can be used as an early detection and fire prevention system to detect a fire before it occurs, and notify a user such that the act to prevent the fire before the fire actually starts.

Fire detection and alert system 200 includes one or more sensors, shown as temperature sensors 204 (e.g., thermocouples, resistance temperature detectors, etc.), according to some embodiments. In some embodiments, temperature sensors 204 are configured to measure/monitor a temperature inside a hood (e.g., exhaust hood, a hazard area, etc.), shown as hood 202. In some embodiments, temperature sensors 204 are positioned within hood 202. In some embodiments, temperature sensors 204 are positioned (e.g., coupled, mounted, removably attached, etc.) to an interior surface of hood 202.

Temperature sensors 204 are configured to provide controller 212 with real time temperature readings, according to some embodiments. In some embodiments, temperature sensors 204 provide controller 212 with signals indicating one or more real time temperature readings (e.g., temperature measurements, monitored temperature values, sensed temperature values, etc.). As shown in FIG. 2, only three temperature sensors 204 are used in fire detection and alert system 200, however, more than three temperature sensors 204 may be used (e.g., four, five, six, etc.). In some embodiments, temperature sensors 204 are configured to wirelessly communicate with controller 212 to provide controller 212 with the real time temperature readings. In some embodiments, temperature sensors 204 are wiredly and communicably connected to controller 212 (e.g., via wire 218). In some embodiments, wire 218 is cladded (e.g., coated, surrounded, enclosed within, etc.) with a thermally resistive material. In some embodiments the thermally resistive material prevents wire 218 from becoming damaged due to high temperatures to which wire 218 may be exposed.

Controller 212 is configured to receive the real time temperature readings from temperature sensors 204 and determine if a fire has occurred or if a fire is likely to occur based on the real time temperature readings, according to some embodiments. In some embodiments, controller 212 includes a Human Machine Interface (HMI). Controller 212 may be configured to detect sudden changes of the real time temperature readings and provide suppression system activator 208 with activation signals. In some embodiments, suppression system activator 208 is configured to receive the activation signals from controller 212 and activate fire suppression system 10. Fire suppression system 10 includes one or more nozzles 42 fluidly coupled to suppressant tank 12 via pipe 40, according to some embodiments. In some embodiments, suppression system activator 208 is configured to activate fire suppression system 10 such that fire suppressing agent flows out of the fire suppressant tank 12, through pipe 40, and exits nozzles 42 to extinguish a fire present in hood 202. In some embodiments, suppression system activator 208 is configured to activate actuator 30 in response to receiving activation signals from controller 212.

Controller 212 may output information to alarm device 214, according to some embodiments. In some embodiments, alarm device 214 is configured to provide any of a visual and an aural alert in response to receiving a command from controller 212. In some embodiments, alarm device 214 includes one or more light emitting devices (e.g., light emitting diodes) and is configured to actuate the one or more light emitting devices in response to receiving a command/indication from controller 212. In some embodiments, alarm device 214 includes a display screen (e.g., an LCD screen, an LED screen, etc.), configured to provide a message to a user regarding the command received from controller 212. In some embodiments, the type of alert provided by alarm device 214 depends on the command received from controller 212. For example, in some embodiments, controller 212 provides alarm device 214 with a command to produce a visual alert. In some embodiments, controller 212 may provide alarm device 214 with a command to produce both a visual and an aural alert (e.g., actuating/flashing one or more light emitting devices and producing a noise with a speaker).

Alarm device 214 may include any number of visual display devices (e.g., screens, displays, light emitting devices, etc.) and/or any number of aural alert devices (e.g., sirens, speakers, etc.). In some embodiments, alarm device 214 produces a visual and/or an aural alert in response to a command received from controller 212. In some embodiments, alarm device 214 is configured to provide individuals with an alert (e.g., visual, aural, a combination of both) in a nearby area (e.g., a kitchen). For example, if fire detection and alert system 200 is in a kitchen, alarm device 214 can provide any individuals within the kitchen with an alert, a warning, a notification, etc.

In some embodiments, controller 212 is configured to provide message service 216 with a message regarding any of an alert, a warning, a notification of activation of fire suppression system 10, one or more real time temperature readings, historical temperature readings, etc. In some embodiments, message service 216 is a component of controller 212. In some embodiments, message service 216 is a remote server configured to receive the message from controller 212 and provide an alert to a remotely situated person of interest. In some embodiments, message service 216 is a Short Message Service (SMS), configured to send an SMS message to a user device (e.g., a cellular device, a smartphone, etc.). In some embodiments, message service 216 provides the user with the message (e.g., an alert message, a warning message, a notification message, etc.) via a smart phone application. For example, message service 216 may provide the message/alert to a remote server, and a user may access the remote server with a wirelessly communicable device (e.g., a smart phone, a computer, a tablet, etc.). In some embodiments, controller 212 includes a wireless radio configured to provide the remotely situated user/person of interest with any of an alert, an alarm, a notification, etc. In some embodiments, the alert, message, alarm, notification, etc., is any of an SMS message, an email, an automated phone call, etc.

In some embodiments, fire detection and alert system 200 includes an ambient sensor (e.g., a thermocouple), shown as ambient temperature sensor 210. In some embodiments, ambient temperature sensor 210 is configured to measure (e.g., monitor, record, detect, sense, etc.) an ambient temperature outside of hood 202. In some embodiments, ambient temperature sensor 210 is configured to provide controller 212 with real time temperature readings of the ambient temperature outside of hood 202. In some embodiments, ambient temperature sensor 210 is wiredly and communicably connected with controller 212. In some embodiments, ambient temperature sensor 210 is a wireless sensor, configured to wirelessly communicate with controller 212 to provide controller 212 with real time ambient temperature readings. For example, if fire detection and alert system 200 is positioned with a kitchen, ambient temperature sensor 210 may be positioned within a dining area and measure ambient temperature in the dining area.

In some embodiments, controller 212 is configured to receive temperature readings from temperature sensors 204 and/or ambient temperature sensor 210 over a learning period to determine characteristic/archetypal parameters for the specific application of fire detection and alert system 200. For example, in some embodiments, hood 202 is an exhaust hood for a stove, an oven, a fryer, etc. In some embodiments, hood 202 is an exhaust hood of a kitchen or restaurant application. In some embodiments, the learning period facilitates controller 212 learning application (e.g., cooking) specific temperatures, and other application (e.g., cooking) related data. In some embodiments, learning application specific temperatures and other application related data facilitates a more accurate alarm/alert system for controller 212. For example, a kitchen with a relatively high ambient temperature may have a different typical cooking temperature, while a kitchen with a very low ambient temperature may have a different typical cooking temperature. The learning period facilitates controller 212 learning archetypal/characteristic/average values for any of average hood/cooker temperature $T_{H,avg}$ (e.g., an average hazard temperature associated with a hazard area), average rise rate of hood temperatures $$\frac{\Delta T}{\Delta t}\Big|_{H,avg},$$

average ambient temperatures $T_{amb,avg}$, average hood to ambient temperature differentials $\Delta T_{diff,avg}$, etc., specific to the application of hood 202. In some embodiments, the archetypal/characteristic/average values can be used by controller 212 to determine if one or more monitored variables are unusual (e.g., unusually high $$\frac{\Delta T}{\Delta t}\Big|_{H})$$

which may indicate a hazardous event (e.g., a fire). In some embodiments, the archetypal/characteristic/average values can be used by controller 212 to minimize spurious suppression actuation and achieve faster detection of abnormal application (e.g., cooking) values (e.g., cooking temperature, rise rate, temperature differentials, etc.).

In some embodiments, controller 212 is configured to monitor one or more temperature values (e.g., one or more hazard temperatures of a hazard area) of hood 202 and/or a surrounding environment to determine the archetypal/characteristic/average values. In some embodiments, controller 212 can reprogram itself to identify hazards based on the archetypal/characteristic/average values specific to the application. In some embodiments, controller 212 can provide the characteristic values to a remote server via data service interface 220. In some embodiments, data service interface 220 is a component of controller 212. In some embodiments, data service interface 220 is any of or a combination of an RS-232 serial interface, a Bluetooth interface (e.g., a wireless interface), a USB interface, an Ethernet interface, etc. In some embodiments, controller 212 is configured to provide the characteristic values to a remote database, server, or device. In some embodiments, the characteristic values can be provided to controller 212 from the remote database, server, or device for hazard detection. In some embodiments, controller 212 includes or is communicably connected to a Human Machine Interface (HMI). In some embodiments, the characteristic values can be accessed via HMI. In some embodiments, the learning period can be re-performed to re-determine the characteristic values for the specific application. For example, if hood 202 will be used for a different application, the learning period can be performed again to determine the characteristic values for the new application. In some embodiments, multiple learning periods can be performed, and the characteristic values for each learning period can be stored in the remote server, database, device, etc., or locally in controller 212. In some embodiments, controller 212 is communicably connected (e.g., wirelessly) to a remote device via data service interface 220. In some embodiments, the remote device can monitor real time temperature sensor information, performance data, and event/alarm/alert data.

In some embodiments, controller 212 provides the characteristic values and real-time information to the remote server, database, or device. In some embodiments, once the characteristic values are stored in the remote server or device, another device can communicably connect with the remote server/device via mobile computing platforms. In some embodiments, only an authorized agent can access the characteristic values and/or real time information at the remote server/device.

It should be understood that while controller 212 as described herein receives hood temperatures from temperature sensors 204, controller 212 may also receive any hazard temperatures from a corresponding temperature sensor of a hazard area. Controller 212 can perform any of the functionality described herein to determine characteristic, archetypal, average, or typical values during normal operation of equipment at the hazard area and use the characteristic values to detect a fire condition at the hazard area. Controller 212 can then operate or activate a fire suppression system (e.g., fire suppression system 10) to suppress a fire or reduce a likelihood of a fire occurring in the near future at the hazard area. The example of a hood 202 should not be understood as limiting.

Controller Diagram

Figure 3:
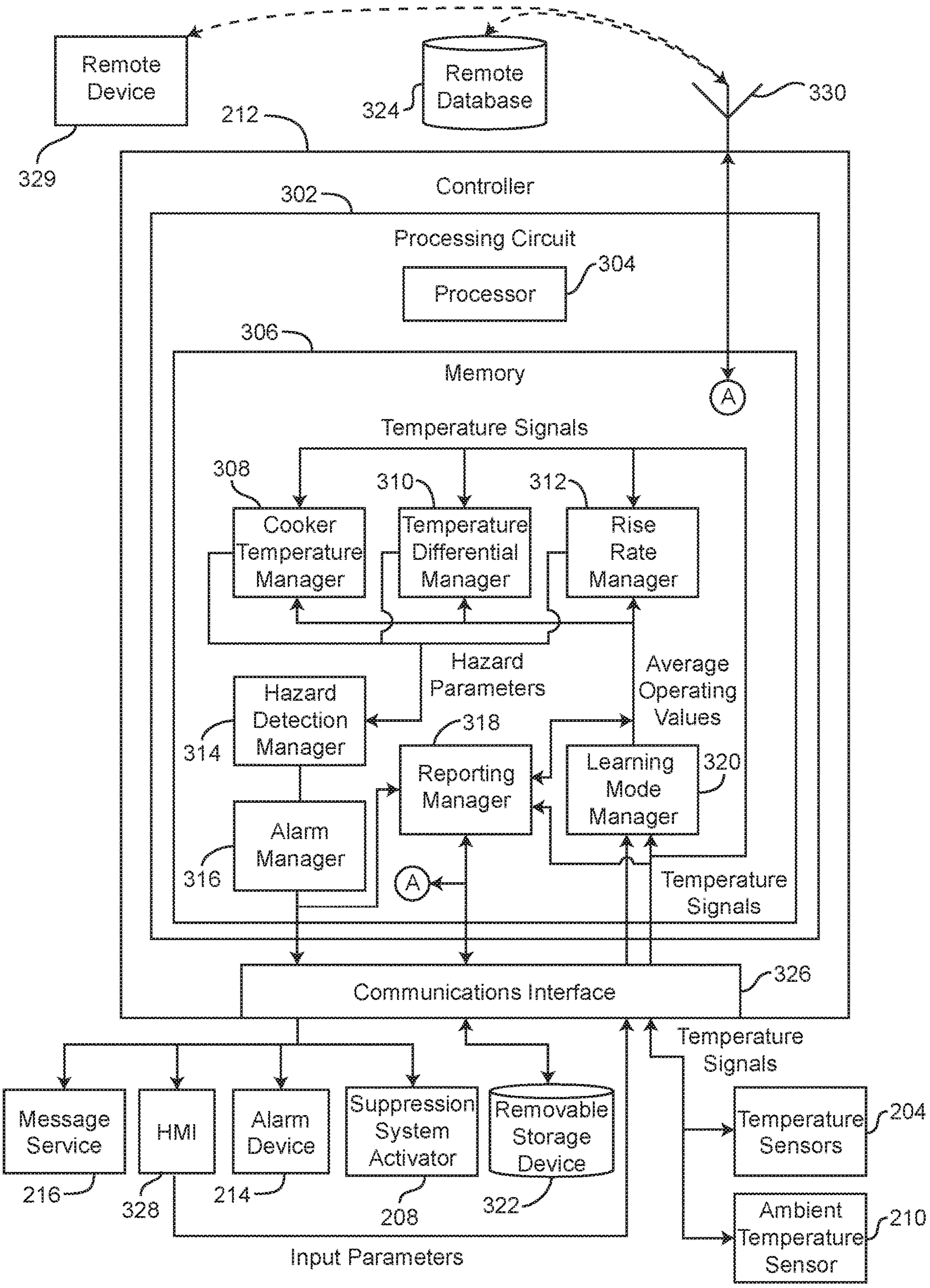
FIG. 3 is a block diagram of various components of the system of FIG. 2 shown to include a learning mode manager, according to some embodiments.

Referring now to FIG. 3, controller 212 is shown in greater detail, according to some embodiments. In some embodiments, controller 212 is configured to receive any of the real time temperature readings from temperature sensors 204 and/or the real time ambient temperature reading from ambient temperature sensor 210 to determine if a fire has occurred or if a fire is likely to occur. In some embodiments, controller 212 is configured to receive temperature readings from temperature sensors 204 and/or ambient temperature readings from ambient temperature sensor 210 over a learning time period to determine one or more characteristic values of hood 202. In some embodiments, controller 212 uses the characteristic values to determine alarms/alerts by comparing temperature readings from temperature sensors 204 and/or ambient temperature sensor 210 to the characteristic values.

Controller 212 is shown to include a communications interface 326, according to some embodiments. Communications interface 326 may facilitate communications between controller 212 and external applications (e.g., temperature sensors 204, message service 216, etc.) for facilitating any of user control, monitoring, alarm output, adjustment, etc., to any of temperature sensors 204, ambient temperature sensor 210, suppression system activator 208, alarm device 214, HMI 328, message service 216, or any other device, system, sensor, inputs, outputs, etc. Communications interface 326 may also facilitate communications between controller 212 and a remote server or remote system. In some embodiments, communications interface is or includes data service interface 220. In some embodiments, communications interface is configured to facilitate communications between controller 212 and one or more external devices (e.g., a remote server, a remote device, a removable data storage device, etc.).

Communications interface 326 can be or include wired or wireless communications interfaces (e.g., jacks, antennas, transmitters, receivers, transceivers, wire terminals, etc.) for conducting data communications with any of message service 216, HMI 328, alarm device 214, suppression system activator 208, temperature sensors 204, ambient temperature sensor 210, a remote server, remote database 324, removable storage device 322, or other external systems or devices. In various embodiments, communications via communications interface 326 can be direct (e.g., local wired or wireless communications) or via a communications network (e.g., a WAN, the Internet, a cellular network, etc.). For example, communications interface 326 can include an Ethernet card and port for sending and receiving data via an Ethernet-based communications link or network. In another example, communications interface 326 can include a Wi-Fi transceiver for communicating via a wireless communications network. In another example, communications interface 326 can include cellular or mobile phone communications transceivers.

Still referring to FIG. 3, controller 212 is shown to include a processing circuit 302 including a processor 304 and memory 306, according to some embodiments. Processing circuit 302 can be communicably connected to communications interface 326 such that processing circuit 302 and the various components thereof can send and receive data via communications interface 326. Processor 304 can be implemented as a general purpose processor, an application specific integrated circuit (ASIC), one or more field programmable gate arrays (FPGAs), a group of processing components, or other suitable electronic processing components.

Memory 306 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 306 can be or include volatile memory or non-volatile memory. Memory 306 can include database components, object code components, script components, or any other type of information structure for supporting the various activities and information structures described in the present application. According to some embodiments, memory 306 is communicably connected to processor 304 via processing circuit 302 and includes computer code for executing (e.g., by processing circuit 302 and/or processor 304) one or more processes described herein.

Referring still to FIG. 3, memory 306 is shown to include learning mode manager 320, according to some embodiments. In some embodiments, learning mode manager 320 is configured to receive one or more temperature readings from temperature sensors 204 and/or ambient temperature sensor 210 to determine average (e.g., characteristic, archetypal, typical, normal, regular, etc.) values. In some embodiments, learning mode manager 320 receives one or more input parameters from HMI 328. In some embodiments, the one or more input parameters include but are not limited to a cooking start time $TD_{cook,start}$ (hh/mm), a cooking end time $TD_{cook,start}$ (hh/mm), a cooking hood temperature recording start date $D_{T,start}$ (mm/dd/yy), a cooking hood temperature recording end date $D_{T,end}$ (mm/dd/yy), an ambient temperature recording start date $D_{T,amb,start}$ (mm/dd/yy), and an ambient temperature recording end date $D_{T,amb,end}$ (mm/dd/yy). In some embodiments, the cooking start time and the cooking end time indicate a typical time of day which cooking starts and ends. In some embodiments, a cooking time frame can be calculated for each day based on the cooking start time and the cooking end time. In some embodiments, the cooking time frame is an amount of time which cooking occurs daily. In some embodiments, the cooking hood temperature recording start date indicates a day on which hood temperatures (e.g., temperatures measured by temperature sensors 204) begin being recorded, and the cooking hood temperature recording end date indicates a day on which hood temperatures (e.g., temperatures measured by temperature sensors 204) should stop being recorded. Likewise, in some embodiments, the ambient temperature recording start date indicates a day on which ambient temperatures (e.g., temperatures recorded by ambient temperature sensor 210) should start being recorded, and the ambient temperature recording end date indicates a day on which ambient temperatures should stop being recorded. In some embodiments, a total number of days (cooking hood temperature time frame) over which the cooking hood temperature is recorded can be determined using the cooking hood temperature recording start date and the cooking hood temperature recording end date. For example, if $D_{T,start}$ is Jan. 1, 2018, and $D_{T,end}$ is Feb. 1, 2018, cooking hood temperatures are recorded for 31 days, according to some embodiments. Likewise, a total number of days over which the ambient temperature is recorded (ambient temperature time frame) can be determined using the ambient temperature recording start date and the ambient temperature recording end date.

In some embodiments, learning mode manager 320 is configured to receive $TD_{cook,start}$, $TD_{cook,start}$, $D_{T,start}$, $D_{T,end}$, $D_{T,amb,start}$, and $D_{T,amb,end}$, and calculate the total number of days over which the cooking hood temperature and the ambient temperature are recorded. In some embodiments, learning mode manager 320 is configured to record temperature values received from temperature sensors 204 and/or ambient temperature sensor 210 at regular intervals (e.g., every 1 second, every 0.5 seconds, every 10 seconds, etc.). In some embodiments, the temperature readings from temperature sensors 204 between $D_{T,start}$ and $D_{T,end}$ indicate hood temperatures collected, measured, or recorded between $D_{T,start}$ and $D_{T,end}$. In some embodiments, the hood temperature values recorded throughout the cooking hood temperature time frame are stored in a hood temperature set $\{T_H\}$. In some embodiments, the ambient temperature values recorded throughout the ambient temperature time frame are stored in a ambient temperature set $\{T_{amb}\}$. In some embodiments, learning mode manager 320 is configured to use the collected hood temperature values and ambient temperature values to determine an average cooking temperature $T_{H,avg}$, an average ambient temperature $T_{amb,avg}$, an average rise rate of the hood temperature $$\left.\frac{\Delta T}{\Delta t}\right|_{H,avg},$$

and an average temperature differential between the hood temperature and the ambient temperature, $\Delta T_{diff,avg}$. In some embodiments, $T_{H,avg}$, $T_{amb,avg}$, $$\left.\frac{\Delta T}{\Delta t}\right|_{H,avg},$$

and $T_{diff,avg}$ are referred to as Cooking Specific Temperature Values (CSTV), or more generally, Application Specific Temperature Values (ASTV). In some embodiments, learning mode manager 320 is configured to provide any of reporting manager 318, remote database 324, removable storage device 322, remote device 329, and/or any other external device, system, server, etc. with the CSTV. In some embodiments, learning mode manager 320 stores the CSTV in a data storage device (e.g., removable storage device 322). In some embodiments, learning mode manager 320 stores the CSTV in remote database 324 and/or remote device 329. In some embodiments, learning mode manager 320 provides reporting manager 318 with the CSTV.

Referring still to FIG. 3, memory 306 includes reporting manager 318, according to some embodiments. In some embodiments, reporting manager 318 is configured to facilitate one or more reporting actions. In some embodiments, reporting manager 318 is configured to receive the CSTV from learning mode manager 320 and provide the CSTV to any of remote database 324, remote device 329, and removable storage device 322. In some embodiments, reporting manager 318 is configured to wirelessly provide remote device 329 and/or remote database 324 with the CSTV via wireless radio 330. In some embodiments, wireless radio 330 is any wireless transceiver, receiver, radio, cellular dongle, wirelessly communicable device, etc., configured to facilitate wireless communication between controller 212 and an external/remote device, system, or server. In some embodiments, wireless radio 330 provides controller 212 and any of the components therein with Internet connection. In some embodiments, wireless radio 330 is configured to operate according to any of a Bluetooth protocol, a ZigBee protocol, a LoRa protocol, etc., to establish wireless communication between controller 212 and an external server, system, or device. In some embodiments, reporting manager 318 is configured to receive alarm notification from alarm manager 316 and provide the alarms to any of the devices, systems, servers, etc., to which reporting manager 318 is configured to provide the CSTV. In some embodiments, reporting manager 318 receives real time temperature sensor signals from any of temperature sensors 204 and ambient temperature sensor 210 and provides the real time temperature signals/information to any of the devices, systems, servers, etc., to which reporting manager 318 is configured to provide the CSTV.

Referring still to FIG. 3, memory 306 is shown to include rise rate manager 312, temperature differential manager 310, and cooker temperature manager 308, according to some embodiments. In some embodiments, rise rate manager 312, temperature differential manager 310, and cooker temperature manager 3078 are configured to receive real time temperature readings from any of temperature sensors 204 and ambient temperature sensor 210. In some embodiments, rise rate manager 312, temperature differential manager 310 and cooker temperature manager 308 are configured to determine one or more variables based on the real time temperature values received from temperature sensors 204 and/or ambient temperature sensor 210 and compare the determined variables and/or received temperature readings to a corresponding CSTV. In some embodiments, each of rise rate manager 312, temperature differential manager 310, and cooker temperature manager 308 are configured to determine if a fire has occurred or is likely to occur based on the comparison between the determined variable and the corresponding CSTV or based on the comparison between the received real time temperature value and the corresponding CSTV.

Rise rate manager 312 is configured to receive an average rise rate of the hood/cooker temperature, $$\left.\frac{\Delta T}{\Delta t}\right|_{H,avg},$$

according to some embodiments. In some embodiments, rise rate manager 312 is configured to determine a current rise rate of the hood/cooker temperature $$\left.\frac{\Delta T}{\Delta t}\right|_{H,current}$$

as measured by one or more of temperature sensors 204. In some embodiments, $$\left.\frac{\Delta T}{\Delta t}\right|_{H,current}$$

is an instantaneous or an average rate of change/rise rate of the hood/cooker temperature as measured by temperature sensors 204. For example, rise rate manager 312 may receive a hood/cooker temperature from one or more of temperature sensors 204 at time t=0, and a hood/cooker temperature from temperature sensors 204 at time t=1 sec. In some embodiments, rise rate manager 312 determines a change of the hood/cooker temperature between time t=0 and time t=1 sec. In some embodiments, rise rate manager 312 determines an amount of time which has passed between the two temperature values (e.g., 1 second in this example), and using the change of the hood/cooker temperature and the amount of time which has passed, determines a rate of change of the hood/cooker temperature. In some embodiments, rise rate manager 312 compares the current rise rate of the hood/cooker temperature $$\left.\frac{\Delta T}{\Delta t}\right|_{H,current}$$

to the average/archetypal rise rate of the hood/cooker temperature $$\left.\frac{\Delta T}{\Delta t}\right|_{H,avg}$$

as received from reporting manager 318 and/or learning mode manager 320. In some embodiments, if the current rise rate of the hood/cooker temperature exceeds the average/archetypal rise rate of the hood/cooker temperature by a threshold amount, rise rate manager 312 determines that the current rise rate of the hood/cooker temperature is abnormally high, which may indicate a fire or a likelihood that a fire will occur in the near future. In some embodiments, rise rate manager 312 uses the following condition to determine if the current rise rate of the hood/cooker temperature is abnormally high:

$$\text{If}: \left.\frac{\Delta T}{\Delta t}\right|_{H,current} > (1+\theta)\cdot\left.\frac{\Delta T}{\Delta t}\right|_{H,avg} \quad \text{Then}: \text{Potential Hazard}$$

where θ is a unit-less value (e.g., between 0 and 1). For example, if θ=0.5 and $$\left.\frac{\Delta T}{\Delta t}\right|_{H,current}$$

is greater than $$(1+\theta)\cdot\left.\frac{\Delta T}{\Delta t}\right|_{H,avg},$$

rise rate manager 312 may determine that the current rise rate of the hood/cooker temperature is abnormally high or that a hazard (e.g., a fire) may potentially occur, since $$\left.\frac{\Delta T}{\Delta t}\right|_{H,current}$$

exceeds $$\left.\frac{\Delta T}{\Delta t}\right|_{H,avg}$$

by more than 50%. In some embodiments, a standard deviation $\sigma$ is used to determine if $$\left.\frac{\Delta T}{\Delta t}\right|_{H,current}$$

significantly exceeds $$\left.\frac{\Delta T}{\Delta t}\right|_{H,avg}.$$

For example, rise rate manager 312 may use the following condition to determine if the current rise rate of the hood/cooker temperature is abnormally high:

$$\text{If}:\left.\frac{\Delta T}{\Delta t}\right|_{H,current}>\left.\frac{\Delta T}{\Delta t}\right|_{H,avg}+n\cdot\sigma\ \text{Then}:\text{Potential Hazard}$$

where $\sigma$ is a standard deviation of various $$\frac{\Delta T}{\Delta t}$$

values as determined by learning mode manager 320, and n is a unit-less value (e.g., 0.5, 1, 2, 3, etc.). In some embodiments, for example, if $$\left.\frac{\Delta T}{\Delta t}\right|_{H,current}$$

is 2 standard deviations greater than $$\left.\frac{\Delta T}{\Delta t}\right|_{H,avg},$$

rise rate manager 312 determines that there is a potential fire hazard or that the hood/cooker temperature is rising at an abnormally high rate.

In some embodiments, rise rate manager 312 uses multiple conditions to identify various levels of caution or warning. For example, rise rate manager 312 may use the conditions:

$$\text{If}:(1+\theta_2)\cdot\left.\frac{\Delta T}{\Delta t}\right|_{H,avg}>\left.\frac{\Delta T}{\Delta t}\right|_{H,current}>(1+\theta_1)\cdot\left.\frac{\Delta T}{\Delta t}\right|_{H,avg}\quad\text{Then}:\text{Potential Hazard}$$

$$\text{Elseif}:(1+\theta_3)\cdot\left.\frac{\Delta T}{\Delta t}\right|_{H,avg}>\left.\frac{\Delta T}{\Delta t}\right|_{H,current}>(1+\theta_2)\cdot\left.\frac{\Delta T}{\Delta t}\right|_{H,avg}\quad\text{Then}:\text{Hazard Likely}$$

$$\text{Elseif}:\left.\frac{\Delta T}{\Delta t}\right|_{H,current}>(1+\theta_3)\cdot\left.\frac{\Delta T}{\Delta t}\right|_{H,avg}\quad\text{Then}:\text{Hazard Very Likely}$$

where $\theta_1$, $\theta_2$, and $\theta_3$ are any unit-less values, and $\theta_3>\theta_2>\theta_1$. For example, $\theta_1$ may equal 0.5, $\theta_2$ may equal 1.0, and $\theta_3$ may equal 1.5, according to some embodiments. In this case, if $$\left.\frac{\Delta T}{\Delta t}\right|_{H,current}$$

is 50% greater than $$\left.\frac{\Delta T}{\Delta t}\right|_{H,avg}$$

but less than 100% greater than $$\left.\frac{\Delta T}{\Delta t}\right|_{H,avg}$$

(e.g., less than two times $$\left.\frac{\Delta T}{\Delta t}\right|_{H,avg}),$$

rise rate manager 312 determines that there is a potential hazard. However, if $$\left.\frac{\Delta T}{\Delta t}\right|_{H,current}$$

is 100% greater than $$\left.\frac{\Delta T}{\Delta t}\right|_{H,avg}$$

(i.e., less than two times $$\left.\frac{\Delta T}{\Delta t}\right|_{H,avg})$$

but less than 150% greater than $$\left.\frac{\Delta T}{\Delta t}\right|_{H,avg}$$

(i.e., less than 2.5 times $$\left.\frac{\Delta T}{\Delta t}\right|_{H,avg}),$$

rise rate manager 312 may determine that a hazard is likely. Finally, if $$\left.\frac{\Delta T}{\Delta t}\right|_{H,current}$$

is 150% greater than $$\left.\frac{\Delta T}{\Delta t}\right|_{H,avg}$$

greater than 2.5 times $$\left.\frac{\Delta T}{\Delta t}\right|_{H,avg}),$$

rise rate manager 312 determines that a fire hazard is very likely or imminent.

Likewise, rise rate manager 312 may use standard deviations to quantify a likelihood of a fire hazard, according to some embodiments. In some embodiments, rise rate manager 312 uses the conditions:

$$\text{If}:\left(\left.\frac{\Delta T}{\Delta t}\right|_{H,avg}+n_2\cdot\sigma\right)>\left.\frac{\Delta T}{\Delta t}\right|_{H,current}>\left(\left.\frac{\Delta T}{\Delta t}\right|_{H,avg}+n_1\cdot\sigma\right)\ \text{Then: Potential Hazard}$$

$$\text{Elseif}:\left(\left.\frac{\Delta T}{\Delta t}\right|_{H,avg}+n_3\cdot\sigma\right)>\left.\frac{\Delta T}{\Delta t}\right|_{H,current}>\left(\left.\frac{\Delta T}{\Delta t}\right|_{H,avg}+n_2\cdot\sigma\right)\ \text{Then: Hazard Likely}$$

$$\text{Elseif}:\left.\frac{\Delta T}{\Delta t}\right|_{H,current}>\left(\left.\frac{\Delta T}{\Delta t}\right|_{H,avg}+n_3\cdot\sigma\right)\ \text{Then: Hazard Very Likely}$$

where $n_1$, $n_2$, and $n_3$ are unit-less values (e.g., 0.5, 1, 2, 1.5, etc.) and $n_3>n_2>n_1$. For example, if $n_1=1$, $n_2=1.5$, and $n_3=2.0$, rise rate manager 312 determines a potential hazard if $$\left.\frac{\Delta T}{\Delta t}\right|_{H,current}$$

is one standard deviation greater than $$\left.\frac{\Delta T}{\Delta t}\right|_{H,avg}$$

but less than $$\left.\frac{\Delta T}{\Delta t}\right|_{H,avg}$$

plus one and a half standard deviations, a likely hazard if $$\left.\frac{\Delta T}{\Delta t}\right|_{H,current}$$

is one and a half standard deviations greater than $$\left.\frac{\Delta T}{\Delta t}\right|_{H,avg}$$

but less than $$\left.\frac{\Delta T}{\Delta t}\right|_{H,avg}$$

plus two standard deviations, and a very likely hazard if $$\left.\frac{\Delta T}{\Delta t}\right|_{H,current}$$

is two standard deviations or more greater than $$\left.\frac{\Delta T}{\Delta t}\right|_{H,avg}.$$

In some embodiments, rise rate manager 312 determines an amount by which $$\left.\frac{\Delta T}{\Delta t}\right|_{H,current}$$

exceeds $$\left.\frac{\Delta T}{\Delta t}\right|_{H,avg}.$$

In some embodiments, the amount by which $$\left.\frac{\Delta T}{\Delta t}\right|_{H,current}$$

exceeds $$\left.\frac{\Delta T}{\Delta t}\right|_{H,avg}$$

can be used to determine a likelihood of a fire hazard in the near future.

In this way, elevated hood/cooker temperature rise rates can be used to determine a likelihood of a fire hazard in the near future, according to some embodiments. In some embodiments, rise rate manager 312 provides hazard detection manager 314 with any of an indication regarding either $$\left.\frac{\Delta T}{\Delta t}\right|_{H,current}$$

exceeding $$\left.\frac{\Delta T}{\Delta t}\right|_{H,avg},$$

an amount which $$\left.\frac{\Delta T}{\Delta t}\right|_{H,current}$$

exceeds $$\left.\frac{\Delta T}{\Delta t}\right|_{H,avg},$$

and a likelihood of a fire hazard occurring in the near future.

In some embodiments, rise rate manager 312 determines multiple ranges of $$\left.\frac{\Delta T}{\Delta t}\right|_{H,current}$$

and a corresponding likelihood of a hazard occurring in the near future. Rise rate manager 312 may use any of the standard deviation approach and the percentage approach as described in greater detail above, or may use an absolute approach. For example, in some embodiments, various absolute values are used to determine various ranges of $$\left.\frac{\Delta T}{\Delta t}\right|_{H,current},$$

with corresponding likelihoods of a hazard occurring in the near future. For example, rise rate manager 312 may determine that if $$\left.\frac{\Delta T}{\Delta t}\right|_{H,current}$$

exceeds $$\left.\frac{\Delta T}{\Delta t}\right|_{H,avg}$$

by 5 degrees Fahrenheit per second, a hazard is likely, if $$\left.\frac{\Delta T}{\Delta t}\right|_{H,current}$$

exceeds $$\left.\frac{\Delta T}{\Delta t}\right|_{H,avg}$$

by 10 degrees Fahrenheit per second, a hazard is very likely, if $$\left.\frac{\Delta T}{\Delta t}\right|_{H,current}$$

exceeds $$\left.\frac{\Delta T}{\Delta t}\right|_{H,avg}$$

by 15 degrees Fahrenheit per second, a hazard is imminent, etc. In some embodiments, rise rate manager 312 outputs any of an indication of a fire hazard, a likelihood of a fire hazard occurring in the near future, an absolute amount by which $$\left.\frac{\Delta T}{\Delta t}\right|_{H,current}$$

exceeds $$\left.\frac{\Delta T}{\Delta t}\right|_{H,avg},$$

a relative amount by which $$\left.\frac{\Delta T}{\Delta t}\right|_{H,current}$$

exceeds $$\left.\frac{\Delta T}{\Delta t}\right|_{H,avg}$$

(e.g., a percentage), and a number of standard deviations by which $$\left.\frac{\Delta T}{\Delta t}\right|_{H,current}$$

exceeds $$\left.\frac{\Delta T}{\Delta t}\right|_{H,avg}$$

as hazard parameters.

Referring still to FIG. 3, memory 306 is shown to include temperature differential manager 310, according to some embodiments. In some embodiments, temperature differential manager 310 is configured to determine a temperature differential value between the hood/cooker temperature as measured by temperature sensors 204 and the ambient temperature as measured by ambient temperature sensor 210. In some embodiments, temperature differential manager 310 uses the equation: $\Delta T_{diff,current}=T_{amb}-T_H$ to determine a current temperature differential $\Delta T_{diff,current}$ between the ambient temperature and the hood/cooker temperature. In some embodiments, $T_H$ is a mean or average current hood/cooker temperature value. For example, if multiple temperature sensors 204 are used, temperature different manager 310 may either determine a temperature differential based on a mean of the multiple temperature sensors 204, or multiple temperature differentials for each of the multiple temperature sensors 204, or both a temperature differential based on the mean of the multiple temperature sensors 204 and multiple temperature differentials for each of the multiple temperature sensors 204. For purposes of simplicity, $\Delta T_{diff,current}$ may represent any of a temperature differential determined based on the mean of temperature sensors 204, multiple temperature differentials determined based on each of temperature sensors 204, or temperature differentials determined based both on each of temperature sensors 204 and a mean of temperature sensors 204.

In some embodiments, temperature differential manager 310 compares the current temperature differential $\Delta T_{diff,current}$ to the archetypal/average temperature differential $\Delta T_{diff}$. In some embodiments, temperature differential manager 310 uses methods similar to rise rate manager 312 (e.g., a standard deviation approach, a percentage approach, an absolute value approach, etc.) to determine if the current temperature differential $\Delta T_{diff,current}$ is abnormal or to determine a likelihood of a fire hazard. For example, temperature differential manager 310 may determine that if $\Delta T_{diff,current}$ exceeds $\Delta T_{diff,avg}$ by 50%, a fire hazard is likely, if $\Delta T_{diff,current}$ exceeds $\Delta T_{diff,avg}$ by one standard deviation a fire hazard is likely, if $\Delta T_{diff,current}$ exceeds $\Delta T_{diff,avg}$ by 2 degrees Fahrenheit a fire hazard is likely, etc. In some embodiments, temperature differential manager 310 use any of the same multiple ranges approach as rise rate manager 312 with respect to $\Delta T_{diff,current}$ and $\Delta T_{diff,avg}$. In some embodiments, temperature differential manager 310 outputs any of an indication regarding a fire hazard, a likelihood of a fire hazard occurring in the near future, an amount by which $\Delta T_{diff,current}$ exceeds $\Delta T_{diff,avg}$, a number of standard deviations by which $\Delta T_{diff,current}$ exceeds $\Delta T_{diff,avg}$, and a relative (e.g., percentage) amount by which $\Delta T_{diff,current}$ exceeds $\Delta T_{diff,avg}$ as hazard parameters.

Referring still to FIG. 3, memory 306 is shown to include cooker temperature manager 308, according to some embodiments. In some embodiments, cooker temperature manager 308 is configured to compare $T_H$ to $T_{H,avg}$ to determine if $T_H$ as measured by temperature sensors 204 is abnormally high (or likewise, abnormally low). In some embodiments, cooker temperature manager 308 uses approaches similar to rise rate manager 312 to determine if $T_H$ is abnormally high relative to $T_{H,avg}$. For example, cooker temperature manager 308 may use any of a percentage by which $T_H$ exceeds $T_{H,avg}$, a number of standard deviations by which $T_H$ exceeds $T_{H,avg}$, or an absolute amount by which $T_H$ exceeds $T_{H,avg}$ to determine if $T_H$ is abnormally high or if a fire hazard is presently occurring or if a fire hazard is likely to occur in the near future. In some embodiments, cooker temperature manager 308 defines multiple ranges based on percentages, standard deviations, or absolute amounts of $T_H$ with respect to $T_{H,avg}$ to determine a likelihood of a fire hazard occurring in the near future similarly to how rise rate manager 312 defines multiple ranges for $$\left.\frac{\Delta T}{\Delta t}\right|_{H,current}$$

with respect to $$\left.\frac{\Delta T}{\Delta t}\right|_{H,avg}.$$

In some embodiments, cooker temperature manager 308 outputs any of an indication of a fire hazard, a determination that a fire has occurred, a likelihood of a fire occurrence in the near future, an absolute amount by which $T_H$ exceeds $T_{H,avg}$, a relative amount (e.g., percentage) by which $T_H$ exceeds $T_{H,avg}$, and a number of standard deviations by which $T_H$ exceeds $T_{H,avg}$ as hazard parameters.

Referring still to FIG. 3, hazard detection manager 314 is shown receiving the hazard parameters from any of cooker temperature manager 308, temperature differential manager 310, and rise rate manager 312, according to some embodiments. In some embodiments, hazard detection manager 314 receives the hazard parameters and determines an appropriate alert response based on the hazard parameters. For example, hazard detection manager 314 may determine whether any of a visual alert, an aural alert, a remote alert, etc., should be performed, according to some embodiments. In some embodiments, hazard detection manager 314 detects a severity of a hazard (e.g., a presently occurring hazard or a near future hazard) and determines an appropriate alert/alarm based on the severity of the hazard. In some embodiments, hazard detection manager 314 provides alarm manager 316 with the type of alert/alarm which should be provided/performed. In some embodiments, alarm manager 316 is configured to adjust an operation of any of HMI 328, message service 216, alarm device 214, suppression system activator 208, etc. to provide one or more users with the alarm/alert. In some embodiments, alarm manager 316 is configured to receive a command from hazard detection manager 314 to cause suppression system activator 208 to activate fire suppression system 10. For example, if alarm manager 316 receives an indication from hazard detection manager 314 regarding a current fire hazard, alarm manager 316 may cause suppression system activator 208 to activate fire suppression system 10. In some embodiments, alerts provided to one or more users include any of a visual alert, an aural alert, a notification, a message, a textual alert, a remote alert such as a text message, an email, an automated phone call, etc.

Figure 4:
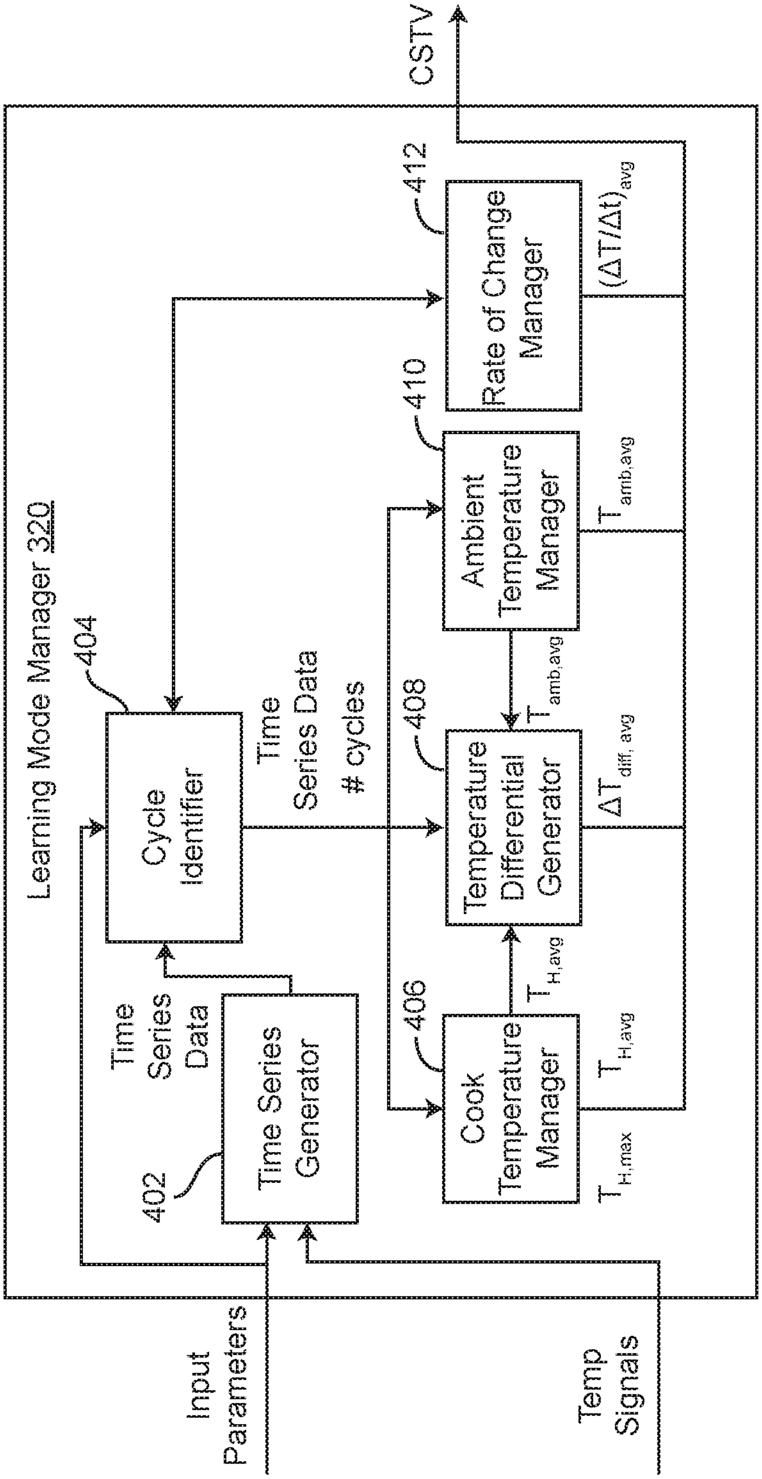
FIG. 4 is a block diagram of the learning mode manager of the controller of FIG. 2, according to some embodiments.

Referring now to FIG. 4, learning mode manager 320 is shown in greater detail, according to some embodiments. In some embodiments, learning mode manager 320 is configured to receive temperature readings from any of temperature sensors 204 and ambient temperature sensor 210 in addition to input parameters from HMI 328. Learning mode manager 320 is shown to include time series generator 402, cycle identifier 404, cook temperature manager 406, temperature differential generator 408, ambient temperature manager 410, and rate of change manager 412, according to some embodiments. In some embodiments, learning mode manager 320 is configured to receive and collect temperature readings for a learning time period as determined by the input parameters. In some embodiments, learning mode manager 320 first receives/collects the temperature readings for the learning time period, and then analyzes the collected temperature readings over the learning time period to determine the CSTV.

Referring still to FIG. 4, learning mode manager 320 includes time series generator 402, according to some embodiments. In some embodiments, time series generator 402 is configured to receive the temperature readings as temperature signals at a sampling/polling rate $f$. In some embodiments, time series generator 402 receives the input parameters which indicate an amount of time to collect information over. In some embodiments, time series generator 402 receives/collects the temperature signals and determines one or more sets of time series data. In some embodiments, the temperature signals which time series generator 402 receives are ambient temperature readings as measured by ambient temperature sensor 210, and/or hood/cooking temperature readings as measured by one or more of temperature sensors 204. In some embodiments, time series generator 402 uses the input parameters to generate the hood temperature set $\{T_H\}$ and the ambient temperature set $\{T_{amb}\}$. In some embodiments, time series generator 402 generates the hood temperature and the ambient temperature sets having a length determined based on the input parameters. For example, in some embodiments, time series generator 402 determines the cooking hood temperature time frame and the ambient temperature time frame, and uses the sampling/polling rate as well as the cooking hood temperature and ambient temperature time frames to determine lengths of the hood temperature set and the ambient temperature set. In some embodiments, time series generator 402 operates to record both the hood temperatures and the ambient temperatures in the hood temperature and ambient temperature sets, respectively, for as long as indicated by the input parameters. Time series generator 402 may provide cycle identifier 404 with the time series data (i.e., the hood temperature set $\{T_H\}$ and the ambient temperature set $\{T_{amb}\}$). In some embodiments, time series generator 402 provides any of cook temperature manager 406, temperature differential generator 408, ambient temperature manager 410, and rate of change manager 412 with the time series data.

Cycle identifier 404 is configured to identify sets of data based on the time series data received from time series generator 402 and/or the input parameters. For example, the input parameters may include the cooking start time and the cooking end time which indicate a typical time of day which cooking starts and ends. In some embodiments, cycle identifier 404 uses the cooking start time and the cooking end time to determine which sections of the time series data correspond to a non-cooking state (e.g., a dormant state). In some embodiments, any of time series data which is from between the cooking start time and the cooking end time is defined as $\{T_{amb}\}_{active}$ and $\{T_H\}_{active}$ where $\{T_{amb}\}_{active} \subseteq \{T_{amb}\}$ and $\{T_H\}_{active} \subseteq \{T_H\}$. In some embodiments, any time series data which is from outside of the cooking start time and the cooking end time is defined as $\{T_{amb}\}_{dormant}$ and $\{T_H\}_{dormant}$ where $\{T_{amb}\}_{dormant} \subseteq \{T_{amb}\}$ and $\{T_H\}_{dormant} \subseteq \{T_H\}$. In some embodiments, cycle identifier 404 provides any of $\{T_{amb}\}_{active}$, $\{T_H\}_{active}$, $\{T_{amb}\}_{dormant}$, and $\{T_H\}_{dormant}$ to any of cook temperature manager 406, temperature differential generator 408, ambient temperature manager 410, and rate of change manager 412.

In some embodiments, cycle identifier 404 is configured to identify subsets of $\{T_{amb}\}_{active}$ and $\{T_H\}_{active}$ which correspond to when the hood temperature is increasing, when the hood temperature is relatively constant, and when the hood temperature is decreasing. In some embodiments, cycle identifier provides rate of change manager 412 with $\{T_H\}_{active}$. In some embodiments, rate of change manager 412 determines a rate of change for each timestep of $\{T_H\}_{active}$, and provides cycle identifier 404 with $$\left\{\frac{dT_H}{dt}\right\}_{active}.$$

In some embodiments, cycle identifier is configured to use $$\left\{\frac{dT_H}{dt}\right\}_{active}$$

to identify sets of hood temperature data which correspond to increasing hood temperature (e.g., sets of hood temperature data for which $$\left\{\frac{dT_H}{dt}\right\}_{active}$$

is positive), sets of hood temperature data which are relatively constant (e.g., sets of hood temperature data for which $$\left\{\frac{dT_H}{dt}\right\}_{active}$$

is approximately zero), and sets of hood temperature data which correspond to decreasing hood temperature (e.g., sets of hood temperature data for which $$\left\{\frac{dT_H}{dt}\right\}_{active}$$

is negative). In some embodiments, cycle identifier 404 is configured to determine various subsets of $\{T_{amb}\}_{active}$ and $\{T_H\}_{active}$ which correspond to increasing hood temperature, relatively constant hood temperature, and decreasing hood temperature. For example, cycle identifier 404 may define n number of $\{T_{amb}\}_{active,increase}$, $\{T_{amb}\}_{active,constant}$, $\{T_{amb}\}_{active,decrease}$, $\{T_H\}_{active,increase}$, $\{T_H\}_{active,constant}$, and $\{T_H\}_{active,decrease}$ sets, where: $\{T_{amb}\}_{active,increase} \subseteq \{T_{amb}\}_{active}$, $\{T_{amb}\}_{active,constant} \subseteq \{T_{amb}\}_{active}$, $\{T_{amb}\}_{active,decrease} \subseteq \{T_{amb}\}_{active}$, $\{T_H\}_{active,increase} \subseteq \{T_H\}_{active}$, $\{T_H\}_{active,constant} \subseteq \{T_H\}_{active}$, and $\{T_H\}_{active,decrease} \subseteq \{T_H\}_{active}$. In some embodiments, cycle identifier 404 provides any of $\{T_{amb}\}_{active,increase}$, $\{T_{amb}\}_{active,constant}$, $\{T_{amb}\}_{active,decrease}$, $\{T_H\}_{active,increase}$, $\{T_H\}_{active,constant}$, and $\{T_H\}_{active,decrease}$ to any of cook temperature manager 406, temperature differential manager 408, ambient temperature manager 410, and rate of change manager 412. In some embodiments, $\{T_H\}_{active,increase}$ corresponds to one or more sections 514 of data 508 of FIG. 5, $\{T_H\}_{active,constant}$ corresponds to one or more sections 516 of data 508 of FIG. 5, $\{T_H\}_{active,decrease}$ corresponds to one or more sections 518 of data 508 of FIG. 5, and $\{T_H\}_{active}$ corresponds to one or more sections 520 of data 508 of FIG. 5.

In some embodiments, each of $\{T_{amb}\}_{active,increase}$, $\{T_{amb}\}_{active,constant}$, $\{T_{amb}\}_{active,decrease}$, $\{T_H\}_{active,increase}$, $\{T_H\}_{active,constant}$, and $\{T_H\}_{active,decrease}$ include n number of subsets, where n is a number of cycles (e.g., cycles between active and dormant) over the cooking hood temperature time frame and/or a number of cycles (e.g., cycles between active and dormant) over the ambient temperature time frame.

In some embodiments, cycle identifier 404 is configured to determine a number of cycles. In some embodiments, cycle identifier 404 determines the number of cycles by determining a number of cooking time frames per day (e.g., 1 per day), and a total number of days over which cooking temperature is recorded. For example, if the cooking temperature is recorded over 31 days and there is one cooking time frame per day, cycle identifier 404 determines that n=31, according to some embodiments. In some embodiments, cycle identifier 404 is configured to provide any of cook temperature manager 406, temperature differential generator 408, ambient temperature manager 410, and rate of change manager 412 with the number of cycles n.

Cook temperature manager 406 is configured to use the time series data and/or $\{T_H\}_{active}$ to determine the average hood temperature $T_{H,avg}$, according to some embodiments. In some embodiments, cook temperature manager 406 receives $\{T_H\}_{active,constant}$ and the n subsets of $\{T_H\}_{active,constant}$ from cycle identifier 404. In some embodiments, cook temperature manager 406 determines an average of each n subset of $\{T_H\}_{active,constant}$. In some embodiments, the average of an arbitrary i subset of $\{T_H\}_{active,constant}$ is referred to as $\overline{\{T_H\}}_{active,constant,i}$. In some embodiments, cycle identifier 404 determines an average of all n subsets $\overline{\{T_H\}}_{active,constant,i}$ using the equation:

$$T_{H,avg} = \frac{\sum_{i=1}^{n} \overline{\{T_H\}}_{active,constant,i}}{n}.$$

In some embodiments, cook temperature manager 406 also determines $T_{H,max}$. In some embodiments, $T_{H,max}$ is an absolute maximum of all elements of $\{T_H\}_{active}$. In some embodiments, $T_{H,max}$ is a maximum of the n subsets of $\{T_H\}_{active,constant}$. For example cook temperature manager 406 may receive the average n subsets of $\{T_H\}_{active,constant}$, and select a maximum average subset, $\overline{\{T_H\}}_{active,constant,max}$. In some embodiments, $T_{H,max}$ is a typical maximum cook temperature. In some embodiments, controller 212 or more specifically cooker temperature manager 308 can use $T_{H,max}$ to determine if a current temperature value exceeds $T_{H,max}$ and therefore if a fire hazard is occurring or will occur soon.

Ambient temperature manager 410 is configured to determine $T_{amb,avg}$, according to some embodiments. In some embodiments, ambient temperature manager 410 receives $\{T_{amb}\}_{dormant}$ from cycle identifier 404 and determines $\{\overline{T_{amb}}\}_{dormant}$, where $\{\overline{T_{amb}}\}_{dormant}$ is an average of all elements of $\{T_{amb}\}_{dormant}$. In some embodiments, $\{\overline{T_{amb}}\}_{dormant}$ indicates an average ambient temperature when hood 202 is dormant. In some embodiments, ambient temperature manager 410 receives $\{T_H\}$ and determines $\{\overline{T_H}\}$, where $\{\overline{T_H}\}$ is an average of all ambient temperature readings received from ambient temperature sensor 210 over the ambient temperature time frame. In some embodiments, ambient temperature manager 410 determines $T_{amb,avg}$ as an average ambient temperature while hood 202 is active. In some embodiments, ambient temperature manager 410 determines $\overline{\{T_{amb}\}}_{active}$ as $T_{amb,avg}$. In some embodiments, ambient temperature manager 410 determines $T_{amb,avg}$ as an average ambient temperature when $T_H$ is relatively constant. For example, Ambient temperature manager 410 may determine an average of all elements/sub-elements of $\{T_{amb}\}_{active,constant}$ as $T_{amb,avg}$.

Temperature differential generator 408 is configured to receive $T_{H,avg}$ and $T_{amb,avg}$ from cook temperature manager 406 and ambient temperature manager 410, respectively. In some embodiments, temperature differential generator 408 is configured to determine the average temperature differential $\Delta T_{diff,avg}$. In some embodiments, temperature differential generator 408 uses the equation $\Delta T_{diff,avg} = T_{H,avg} - T_{amb,avg}$ to determine $\Delta T_{diff,avg}$. In some embodiments, $\Delta T_{diff,avg}$ indicates a normal, average, archetypal, or characteristic temperature differential when hood 202 is active.

Rate of change manager 412 is configured to determine the average rise rate of the hood/cooker temperature, $$\left.\frac{\Delta T}{\Delta t}\right|_{H,avg},$$

according to some embodiments. In some embodiments, rate of change manager 412 receives $\{T_H\}_{active,increase}$ and $\{T_H\}_{active,decrease}$ sets as well as any subsets of $\{T_H\}_{active,increase}$ and $\{T_H\}_{active,decrease}$. In some embodiments, rate of change manager 412 is configured to perform a linear regression for each subset of $\{T_H\}_{active,increase}$ to determine an average rise rate of each cycle (e.g., the slope determined from the linear regression). For example, if $\{T_H\}_{active,increase}$ includes n subsets, rate of change manager 412 determines n average rise rates, with each rise rate corresponding to a cycle. In some embodiments, rate of change manager 412 determines the average rise rate of the hood/cooker temperature, $$\left.\frac{\Delta T}{\Delta t}\right|_{H,avg}$$

by averaging the n average rise rates.

Learning mode manager 320 is configured to provide any of the determine values (e.g., $T_{H,avg}$, $T_{amb,avg}$, $$\left.\frac{\Delta T}{\Delta t}\right|_{H,avg},$$

etc.) as the CSTV for use in hazard detection by controller 212.

Advantageously, the CSTV provide characteristic operating/temperature values for the specific implementation of controller 212 and the fire detection and alert system 200. Other fire detection and suppression systems use a fusible link to detect a fire and to actuate a suppression agent. Once the fusible link reaches a melting point (e.g., a setpoint), the fusible link melts and the suppression system is activated. Based on the ambient temperature of the restaurant and the average cooking temperature of each specific restaurant, the set point of the fusible link may be too low or too high. Additionally, it may take approximately 2-3 minutes before the fusible link melts and activates the suppression system. Using the CSTV to detect or predict fires reduces the need to use a fusible link, provides customizable threshold values which may be unique or specific to the ambient temperature and the average cooking temperature, and activates the suppression system faster than other systems which use the fusible link. Using the CSTV facilitates a more accurate, quicker responding fire detection and suppression system, according to some embodiments. Additionally, using the CSTV removes the need to replace the fusible link after a fire hazard has occurred.

Example Graph

Figure 5:
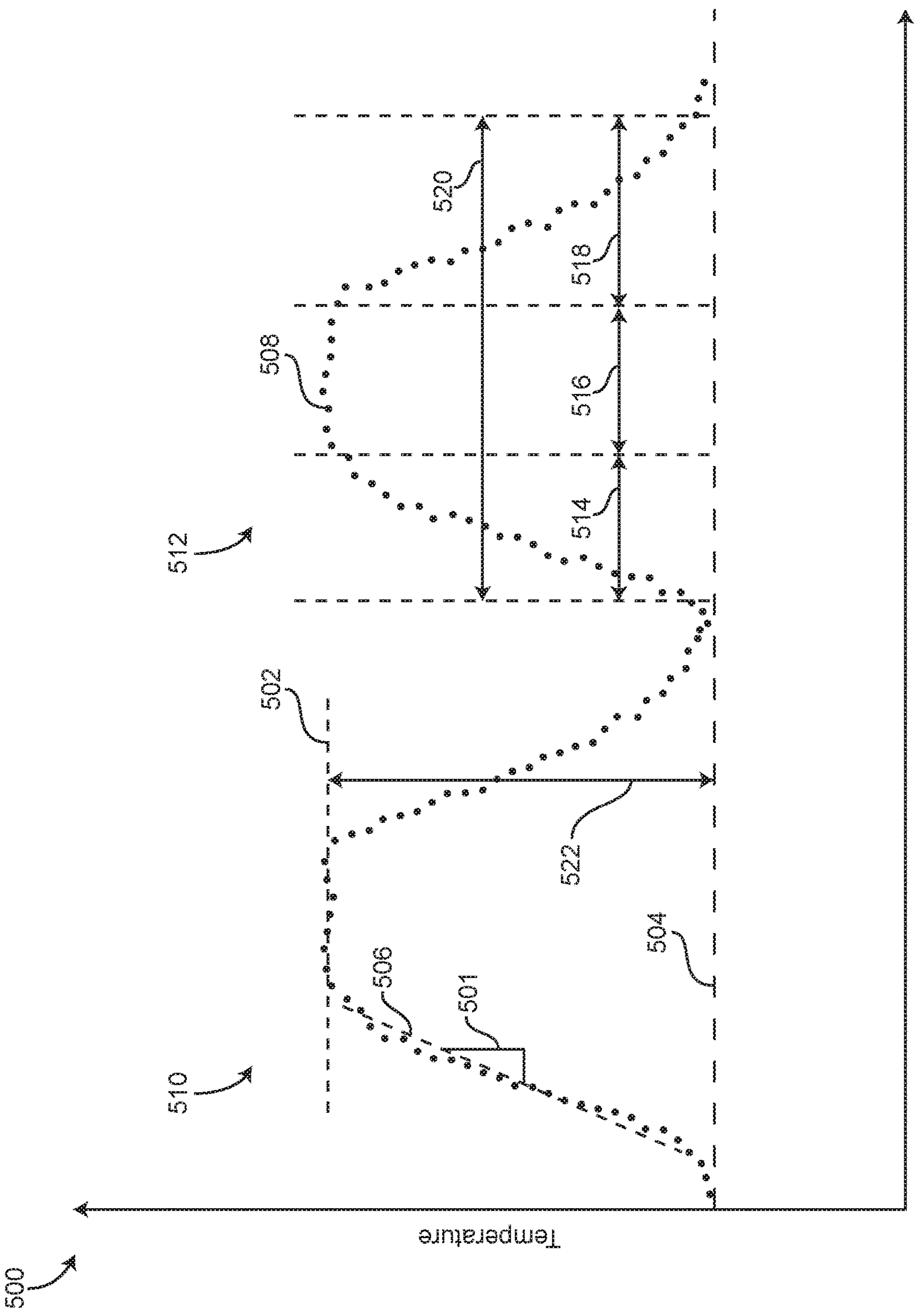
FIG. 5 is a graph of time series temperature data received by the controller of FIG. 2 during a learning period, according to some embodiments.

Referring now to FIG. 5, graph 500 illustrates temperature information received from temperature sensors 204 during the learning period, according to some embodiments. In some embodiments, data 508 illustrates temperature readings periodically received from temperature sensors 204 during the learning period. In some embodiments, data 508 includes a first cycle 510, and a second cycle 512. In some embodiments, each of cycle 510 and cycle 512 include section 514, section 516, and section 518. In some embodiments, section 514 represents portions of data 508 where temperature is increasing. In some embodiments, section 516 represents portions of data 508 where the temperature is relatively constant. In some embodiments, section 518 represents portions of data 508 where the temperature is decreasing. In some embodiments, a linear regression is performed to data within section 514 to determined trendline 506. In some embodiments, a slope 501 of trendline 506 indicates an average rise rate of the temperature for the corresponding cycle (e.g. cycle 510). In some embodiments, slope 501 is determined for each cycle of data 508 (e.g., cycle 510 and cycle 512). In some embodiments, slopes 502 are averaged to determine $$\left.\frac{\Delta T}{\Delta t}\right|_{H,avg}.$$

In some embodiments, rate of change manager 412 is configured to determine slope 501 for each cycle of data 508.

Referring still to FIG. 5, each cycle is shown remaining relatively constant throughout section 516. In some embodiments, an average temperature 502 throughout section 516 can be determined for each cycle. In some embodiments, average temperatures 502 for each cycle can be averaged to determine $T_{H,avg}$. In some embodiments, cook temperature manager 406 is configured to determine average temperature 502 and the average of all average temperature 502 to determine $T_{H,avg}$.

In some embodiments, any data 508 within sections 514-518 (i.e., section 520) is "active" temperature data. In some embodiments, any data 508 outside of sections 520 is "dormant" temperature data.

In some embodiments, data 508 outside of section 520 is shown approaching temperature 504. In some embodiments, the dormant temperature data approaches the ambient temperature of the surroundings. In some embodiments, temperature 504 is $T_{amb,avg}$. In some embodiments, $T_{amb,avg}$ is determined by ambient temperature manager 410 by determining temperature 504.

In some embodiments, a temperature differential 522 between temperature 504 and average temperature 502 can be determined. In some embodiments, temperature differential 522 is a difference between $T_{amb,avg}$ and $T_{H,avg}$. In some embodiments, temperature differential 522 is determined by temperature differential generator 408.

Human Machine Interface

Figure 6:
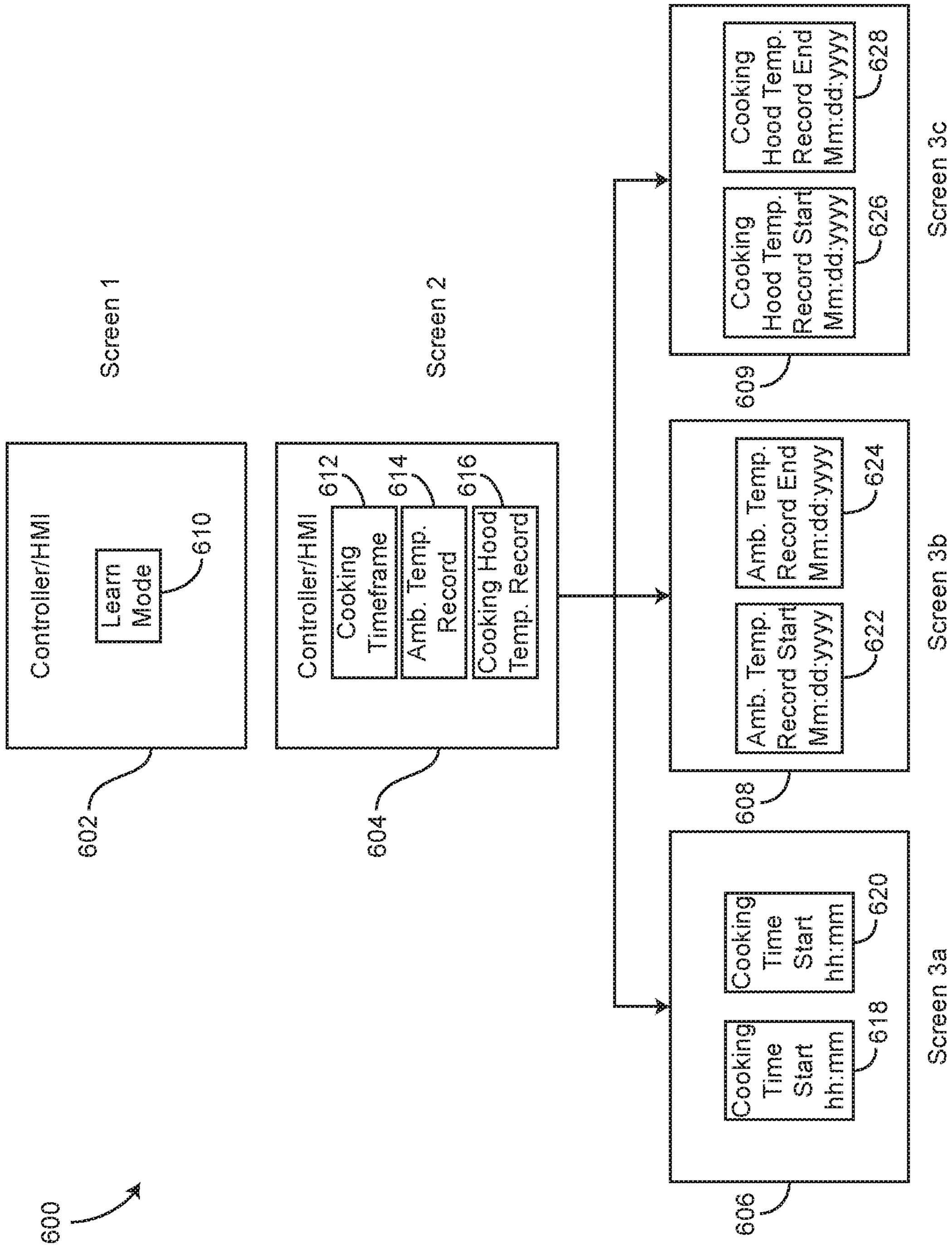
FIG. 6 is a selection schematic of a human machine interface (HMI) of the controller of FIG. 2, according to some embodiments.
Figure 7:
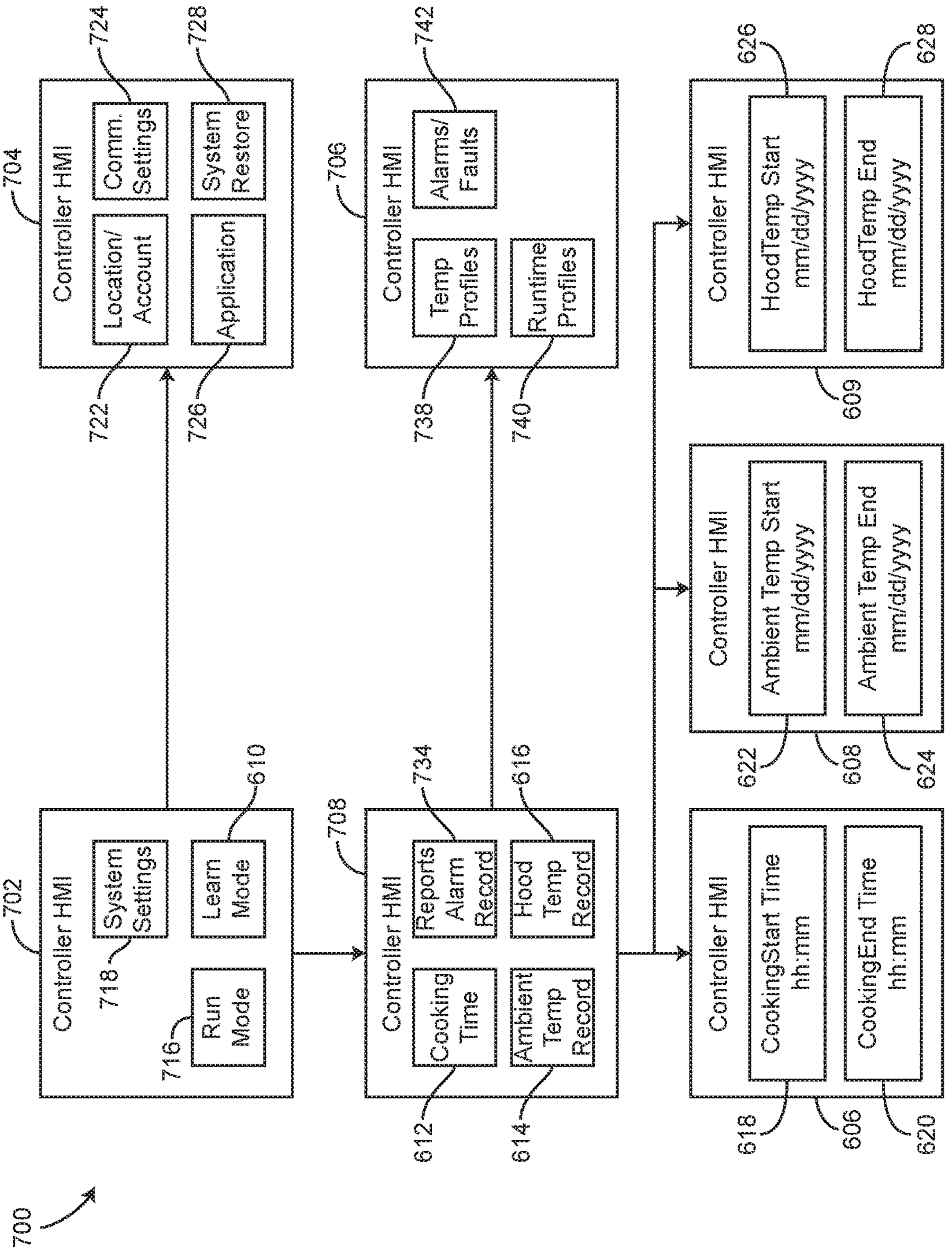
FIG. 7 is a selection schematic of an HMI of the controller of FIG. 2, according to some embodiments.

Referring now to FIGS. 6-7, various selection schematics 600 and 700 are shown, according to some embodiments. In some embodiments, the selection schematics 600 and 700 are selection schematics which a user may use at HMI 328 to input any of the input parameters, cooking specific parameters, and/or to view the CSTV, or previous operational parameters.

Referring to FIG. 6, selection schematic 600 shows various steps for entering input parameters for the learning mode, according to some embodiments. In some embodiments, selection schematic 600 includes screens 602-609. In some embodiments, screens 602-608 are various screens which are displayed to a user vis HMI 328. In some embodiments, screen 602 includes a learn mode selection option 610. In some embodiments, HMI 328 displays screen 604 in response to the user selecting learn mode selection option 610.

Screen 604 includes a cooking time frame selection option 612, an ambient temperature record selection option 614, and a cooking hood temperature record selection option 616. In some embodiments, HMI 328 displays screen 606 in response to the user selecting cooking timeframe selection option 612. In some embodiments, HMI 328 displays screen 608 in response to the user selecting ambient temperature record selection option 614. In some embodiments, HMI 328 displays screen 609 in response to the user selecting cooking hood temperature record selection option 616.

In some embodiments, screen 606 includes a cooking time start input option 618, and a cooking time end input option 620. In some embodiments, HMI 328 is configured to receive cooking start time $TD_{cook,start}$ via cooking time start input option 618. In some embodiments, HMI 328 is configured to receive cooking end time $TD_{cook,end}$ via cooking time end input option 620.

In some embodiments, screen 608 includes an ambient temperature record start input option 622, and an ambient temperature record end input option 624. In some embodiments, HMI 328 is configured to receive the ambient temperature recording start date $D_{T,amb,start}$ via ambient temperature record start input option 622. In some embodiments, HMI 328 is configured to receive the ambient temperature recording end date $D_{T,amb,end}$ via ambient temperature record end input option 624.

In some embodiments, screen 609 includes cooking hood temperature record start input option 626 and cooking hood temperature record end input option 628. In some embodiments, HMI 328 is configured to receive the ambient temperature recording start date $D_{T,start}$ via cooking hood temperature record start input option 626. In some embodiments, HMI 328 is configured to receive the cooking hood temperature recording end date $D_{T,end}$ via cooking hood temperature record end input option 628.

Referring now to FIG. 7, selection schematic 700 is shown, according to some embodiments. In some embodiments, HMI 328 displays selection schematic 700 in response to the learning period/mode being completed. Selection schematic 700 is shown to include screens 702-708 and 606-609, according to some embodiments, In some embodiments, screen 702 includes a system setting selection option 718, a run mode selection option 716 and learn mode selection option 610. In some embodiments, HMI 328 displays screen 704 in response to receiving a selection of system settings selection option 718. In some embodiments, HMI 328 displays screen 708 in response to receiving a selection of learn mode selection option 610 and/or run mode selection option 716. In some embodiments, HMI 328 displays a run mode screen in response to receiving a selection of run mode selection option 716. In some embodiments, the run mode screen displays various run modes, predefined programs, cooking parameter input options, etc., for a cooking application.

In some embodiments, screen 704 includes a location/account selection option 722, a communications setting selection option 724, an application selection option 726, and a system restore selection option 728. In some embodiments, HMI 328 is configured to display location/account information in response to receiving a selection of location/account selection option 722. In some embodiments, HMI 328 displays communications settings information in response to receiving a selection of communications settings selection option 724. In some embodiments, HMI 328 provides controller 212 with a command to reset controller 212 in response to a selection of system restore selection option 728. In some embodiments, HMI 328 displays application information in response to receiving a selection of application selection option 726.

In some embodiments, screen 708 includes cooking timeframe selection option 612, ambient temperature record selection option 614, cooking hood temperature record selection option 616, and a report alarm record selection option 734. In some embodiments, HMI 328 displays screen 706 in response to receiving a selection of report alarm record selection option 734.

In some embodiments, screen 706 includes a temperature profiles selection option 738, an alarm/faults selection option 742, and a runtime profile selection option 740. In some embodiments, HMI 328 is configured to display temperature profile information (e.g., $T_{amb,avg}$ and $T_{H,avg}$, or any other of the CSTV) in response to receiving a selection of temperature profiles selection option 738. In some embodiments, HMI 328 is configured to display alarm/fault information over a previous time period or at a current time in response to receiving a selection of alarms/fault selection option 742. In some embodiments, HMI 328 is configured to display runtime profiles in response to receiving a selection of runtime profiles selection option 740. In some embodiments, HMI 328 is configured to display any of the CSTV and/or the input parameters and/or hazard parameters in response to a selection of at least one of temperature profiles selection option 738, alarms/faults selection option 742, and runtime profiles selection option 740.

Process

Figure 8:
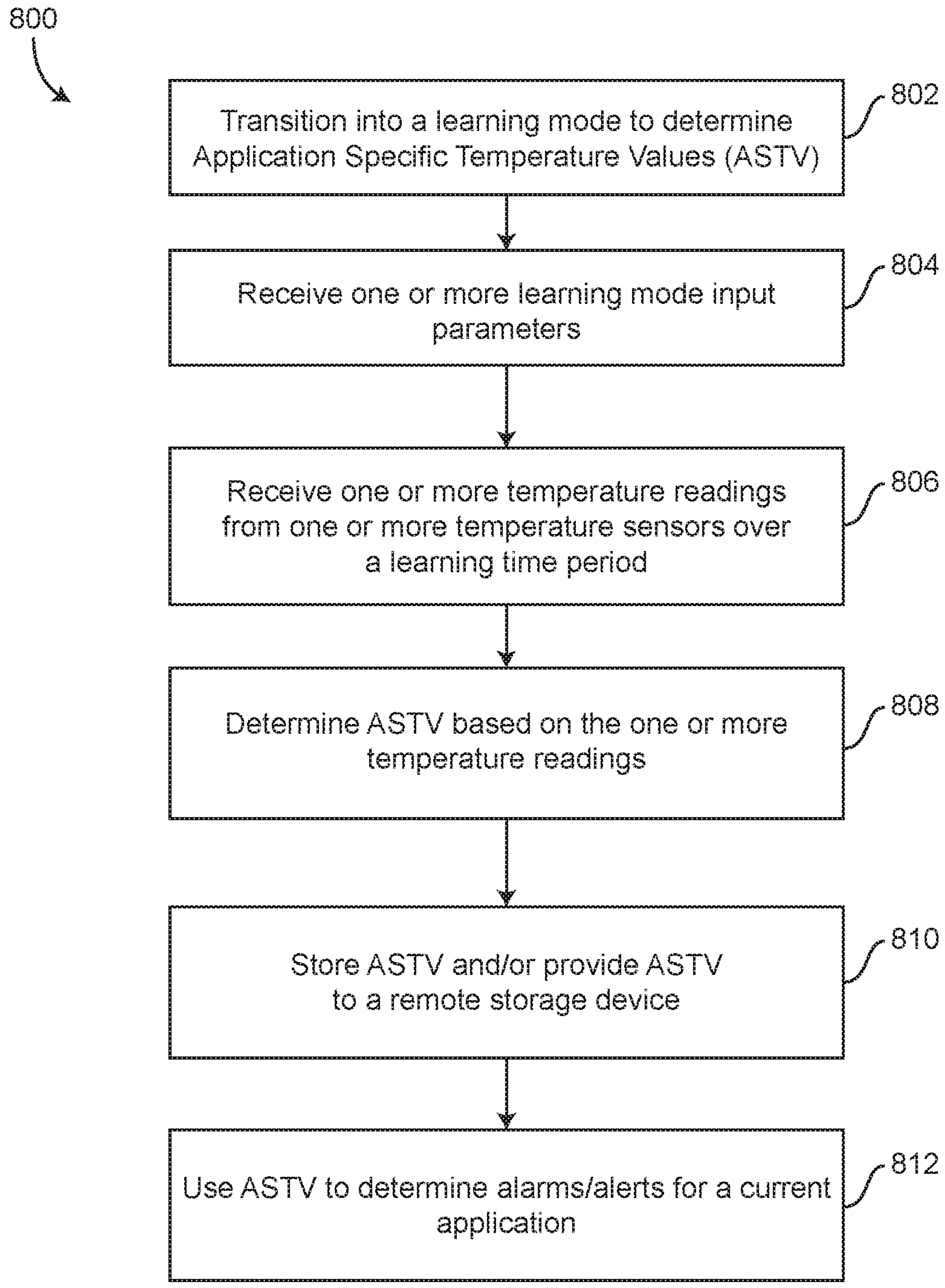
FIG. 8 is a flow diagram of a learning process for a fire suppression system, according to some embodiments.

Referring now to FIG. 8, a process 800 for determining one or more characteristic application parameters (e.g., one or more of CSTV/ASTV) of a fire suppression system 10 is shown, according to some embodiments. Process 800 is shown to include steps 802-812, according to some embodiments. In some embodiments, process 800 is performed by controller 212 and/or any various components of controller 212.

Process 800 includes transitioning into a learning mode to determine the ASTV (step 802), according to some embodiments. In some embodiments, step 802 is performed by controller 212. In some embodiments, step 802 is performed by learning mode manager 320. In some embodiments, step 802 is performed in response to receiving a command, selection, etc., via HMI 328 (e.g., as provided by a user).

Process 800 includes receiving one or more learning mode input parameters (step 804), according to some embodiments. In some embodiments, step 804 includes receiving any of the input parameters described in greater detail above with reference to FIG. 3. In some embodiments, step 804 is facilitated by HMI 328.

Process 800 includes receiving one or more temperature readings from one or more temperature sensors over a learning period (step 806), according to some embodiments. In some embodiments, the one or more temperature readings are received from temperature sensors 204 and/or ambient temperature sensor 210. In some embodiments, the one or more temperature readings are received by controller 212. In some embodiments, the learning time period is determined based on the input parameters of step 804.

Process 800 includes determining the ASTV based on the one or more temperature readings (step 808), according to some embodiments. In some embodiments, step 808 is performed by controller 212. In some embodiments, step 808 is performed by learning mode manager 320 using any of the techniques described in greater detail above with reference to FIGS. 3-4. In some embodiments, the ASTV include any of $T_{H,avg}$, $T_{amb,avg}$, $\Delta T_{diff,avg}$, and $$\left.\frac{\Delta T}{\Delta t}\right|_{H,avg}.$$

Process 800 includes storing the ASTV and/or providing the ASTV to a remote device (step 810), according to some embodiments. In some embodiments, step 810 is performed by controller 212. In some embodiments, step 810 is facilitated by any of communications interface 326, removable storage device 322, reporting manager 318, wireless radio 330, remote database 324, and remote device 329. In some embodiments, the ASTV are stored locally or remotely. In some embodiments, the ASTV are later provided to controller 212 for hazard/fire detection.

Process 800 includes using the ASTV to determine alarms/alerts for a current application (step 812), according to some embodiments. In some embodiments, step 812 is performed by controller 212. In some embodiments, step 812 includes providing the ASTV to any of cooker temperature manager 308, temperature differential manager 310, and rise rate manager 312. Step 812 can include obtaining actual, current, or real-time sensor data from temperature sensors 204 and using the ASTV in combination with the real-time sensor data to identify if a fire is detected or if a fire is likely to occur (e.g., a fire event, a fire condition, etc.).

Energy Usage

Referring again to FIG. 3, in some embodiments, controller 212 is configured to determine an amount of energy being consumed by a cooking system of hood 202. In some embodiments, controller 212 is configured to measure or receive volumetric air flow rate from a sensor. In some embodiments, controller 212 is configured to determine an average energy consumption using any of $\dot{V}_{air}$ (the volumetric air flow rate), $T_{H,current}$, and $T_{amb,current}$. In some embodiments, controller 212 uses an equation to determine energy consumption $\dot{Q}$. In some embodiments, the equation is a function, generally defined as $\dot{Q}=f_{energy}(\dot{V}_{air},T_{H,current},T_{amb,current})$ where $f_{energy}$ is a function relating $\dot{V}_{air}$, $T_{H,current}$, and $T_{amb,current}$ to $\dot{Q}$. In some embodiments, determining $\dot{Q}$ provides insight into system efficiency as well as a cost of operating the system or equipment of the system. In some embodiments, controller 212 uses cooking surface temperatures to determine $\dot{Q}$. In some embodiments, controller 212 uses a gas meter to monitor an amount of fuel used by the system. Using $\dot{Q}$ and the amount of fuel used by the system, system efficiency can be determined by controller 212. In some embodiments, controller 212 uses the system efficiency to determine if the system is operating under a load (e.g., if a cooker is on and cooking). For example, if the energy entering the system is within 90% of measured or calculated thermal output, controller 212 may determine that the system is on but is not under load. Once the system begins to undergo a load, the efficiency changes (e.g., decreases), according to some embodiments.

Remote Update

Referring again to FIG. 3, controller 212 is shown configured to communicate wirelessly via wireless radio 330, according to some embodiments. In some embodiments, controller 212 is wirelessly communicably connected to a remote device 319 and/or a remote database 324. In some embodiments, the remote device 329 can update any of the CSTV or any trigger/parameter/threshold values used by controller 212 to detect a fire. In some embodiments, controller 212 can be updated, reprogrammed, reconfigured, etc., remotely by remote device 329. Advantageously, controller 212 can be updated or remotely reconfigured to operate in accordance with local requirements (e.g., local safety requirements).

Boolean Logic Example

Referring again to FIG. 3, controller 212 may use Boolean logic to detect fire hazards (e.g., a fire condition) and/or activate fire suppression system 10. In some embodiments, controller 212 uses the Boolean logic: IF: not during normal cooking timeframe AND (($\Delta T_{diff,current}$>$\Delta T_{diff,avg}$) OR $$\left(\frac{\Delta T}{\Delta t}\bigg|_{H,current} > \frac{\Delta T}{\Delta t}\bigg|_{H,avg}\right)$$

OR ($T_{H,current}$>$T_{H,max}$)) THEN: activate fire suppression system 10. In some embodiments, the normal cooking timeframe is a time of day when cooking regularly occurs (e.g., business hours, hours when the restaurant is open, etc.).

In some embodiments, controller 212 uses the Boolean logic: IF: during normal cooking time frame AND (($\Delta T_{diff,current}$>$\Delta T_{diff,avg}$) OR $$\left(\frac{\Delta T}{\Delta t}\bigg|_{H,current} > \frac{\Delta T}{\Delta t}\bigg|_{H,avg}\right)$$

OR ($T_{H,current}$>$T_{H,max}$)) THEN: activate aural alarm for a set alarm period.

In some embodiments, controller 212 uses the Boolean logic: IF: alarm elapses AND (($\Delta T_{diff,current}$>$\Delta T_{diff,avg}$) OR $$\left(\frac{\Delta T}{\Delta t}\bigg|_{H,current} > \frac{\Delta T}{\Delta t}\bigg|_{H,avg}\right)$$

OR ($T_{H,current}$>$T_{H,max}$)) THEN: activate fire suppression system 10.

In some embodiments, controller 212 uses the Boolean logic: IF: alarm elapses AND NOT ((($\Delta T_{diff,current}$>$\Delta T_{diff,avg}$) AND $$\left(\frac{\Delta T}{\Delta t}\bigg|_{H,current} > \frac{\Delta T}{\Delta t}\bigg|_{H,avg}\right)$$

AND ($T_{H,current}$>$T_{H,max}$)) THEN: do not activate fire suppression system 10.

In some embodiments, $T_{H,max}$ is a maximum allowable value of $T_{H,current}$. In some embodiments, $T_{H,max}$ is determined based on $T_{H,avg}$. For example, $T_{H,max}$ may be a value relative to $T_{H,avg}$ (e.g. 150% of $T_{H,avg}$, one standard deviation greater than $T_{H,avg}$, etc.) or may be a value greater than $T_{H,avg}$ by some amount (e.g., 5 degrees Fahrenheit, 50 degrees Fahrenheit, etc.).

Alternative Embodiments

It should be understood that while the systems and methods described herein are described with reference to a restaurant hood (e.g., hood 202) and are configured for use with a restaurant system (e.g., a fryer, a cooker, etc.), fire suppression system 10 and/or fire detection and alert system 200 may be configured for use with a vehicle system, an engine bay, mobile equipment, etc., or any other system. It should be understood that the techniques as described herein with reference to various "learning" operations may be performed for systems other than restaurant systems.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term “or,” as used herein, is used in its inclusive sense (and not in its exclusive sense) so that when used to connect a list of elements, the term “or” means one, some, or all of the elements in the list. Conjunctive language such as the phrase “at least one of X, Y, and Z,” unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., “top,” “bottom,” “above,” “below,” etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, the fusible link 54 of the exemplary embodiment may be incorporated in the automatic activation system 50 of the exemplary embodiment. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fire detection and suppression system comprising:

a fire suppression system configured to suppress a fire;

an ambient temperature sensor configured to measure an ambient temperature;

one or more temperature sensors configured to measure a hazard temperature associated with a hazard area;

a controller configured to:

receive ambient temperature readings from the ambient temperature sensor and hood temperature readings from the one or more temperature sensors over a learning time period during which a plurality of cycles of cooking operations are performed at a kitchen device of the hazard area;

determine a plurality of characteristic values comprising the hazard temperature, a difference between the hazard temperature and the ambient temperature, and a time rate of change of the hazard temperature across a section of each of the plurality of cycles of cooking operations, and standard deviations of each of the plurality of characteristic values based on the received ambient temperature readings and the hood temperature readings over the learning time period, the characteristic values and the standard deviations indicating normal operation of the kitchen device at the hazard area;

use the plurality of characteristic values and the plurality of standard deviations to detect a fire condition in response to one or more current conditions of the hazard temperature, the difference between the hazard temperature and the ambient temperature, or the time rate of change of the hazard temperature across the section of the cooking operation deviating from the plurality of characteristic values by an amount, the fire condition detected at the hazard zone at which the ambient temperature readings and the hood temperature readings are obtained over the learning time period; and activate the fire suppression system in response to detecting the fire condition.

2. The fire detection and suppression system of claim 1, wherein the one or more characteristic values comprise at least one of a characteristic ambient temperature, a characteristic hazard temperature, a characteristic rise rate of the hazard temperature, or a characteristic temperature differential between the ambient temperature and the hazard temperature.

3. The fire detection and suppression system of claim 2, wherein the one or more characteristic values are average values.

4. The fire detection and suppression system of claim 1, wherein the controller is further configured to compare at least one of the one or more characteristic values to a corresponding current value to detect the fire condition.

5. The fire detection and suppression system of claim 4, wherein the controller is further configured to determine a likelihood of a fire condition occurring at a near future time based on the comparison of at least one of the one or more characteristic values to the corresponding current values.

6. The fire detection and suppression system of claim 1, wherein the system further comprises a human machine interface configured to receive one or more input parameters.

7. The fire detection and suppression system of claim 6, wherein the controller is further configured to use the one or more input parameters to determine the learning time period.

8. The fire detection and suppression system of claim 1, wherein the controller is further configured to cause an alert device to display an alert in response to detecting the fire condition.

9. The fire detection and suppression system of claim 1, wherein the controller is further configured to store the one or more characteristic values for a later usage.

10. The fire detection and suppression system of claim 1, wherein the one or more characteristic values are specific to an application of the system.

11. The fire detection and suppression system of claim 1, wherein the controller is further configured to provide at least one of the one or more characteristic values to a remote device.

12. A method for determining and using one or more characteristic application parameters of a fire suppression system, the method comprising:

receiving ambient temperature readings from an ambient temperature sensor and hazard temperature readings associated with a hazard area from one or more temperature sensors over a learning time period during which a plurality of cycles of cooking operations are performed at a kitchen device of the hazard area;

determining a plurality of characteristic values comprising the hazard temperature, a difference between the hazard temperature and the ambient temperature, and a time rate of change of the hazard temperature across a section of each of the plurality of cycles of cooking operations, and standard deviations of each of the plurality of characteristic values based on the received ambient temperature readings and the hazard temperature readings over the learning time period, the characteristic values indicating normal operation of the kitchen device at the hazard area;

using the plurality of characteristic values and the plurality of standard deviations to detect a fire condition in response to one or more current conditions of the hazard temperature, the difference between the hazard temperature and the ambient temperature, or the time rate of change of the hazard temperature across the section of the cooking operation deviating from the plurality of characteristic values by an amount, the fire condition detected at the hazard zone at which the ambient temperature readings and the hood temperature readings are obtained over the learning time period; and activating the fire suppression system in response to detecting the fire condition.

13. The method of claim 12, wherein the one or more characteristic values comprise at least one of a characteristic ambient temperature, a characteristic hazard temperature, a characteristic rise rate of the hazard temperature, or a characteristic temperature differential between the ambient temperature and the hazard temperature.

14. The method of claim 12, further comprising:

comparing at least one of the one or more characteristic values to a corresponding current value to detect a fire condition.

15. The method of claim 14, further comprising:

determining a likelihood of a fire condition occurring at a near future time based on the comparison of at least one of the one or more characteristic values and the corresponding current values.

16. The method of claim 12, further comprising:

receiving one or more input parameters from a user; and determining the learning time period based on the one or more input parameters.

17. A controller for a fire suppression system of a hazard area, the controller comprising processing circuitry configured to:

receive a plurality of temperature readings from a temperature sensor over a learning time period during which a plurality of cycles of cooking operations are performed at a kitchen device of the hazard area;

determine a plurality of characteristic values comprising a hazard temperature, a difference between the hazard temperature and an ambient temperature, and a time rate of change of the hazard temperature across a section of each of the plurality of cycles of cooking operations and standard deviations of each of the plurality of characteristic values based on the received temperature readings obtained over the learning time period, the characteristic values indicating normal operation of the kitchen device at the hazard area;

receive one or more temperature readings from the temperature sensor over an operational time period after the learning time period;

compare the one or more temperature readings obtained from the temperature sensor over the operational time period to the plurality of characteristic values to detect a fire condition at the hazard area in response to one or more current conditions of the hazard temperature, the difference between the hazard temperature and the ambient temperature, or the time rate of change of the hazard temperature across the section of the cooking operation deviating from the plurality of characteristic values by an amount, the fire condition detected at the hazard zone at which the plurality of temperature readings are obtained over the learning time period; and activate the fire suppression system in response to detecting the fire condition at the hazard area.

18. The controller of claim 17, wherein the one or more characteristic values comprise at least one of an average cooking temperature, an average ambient temperature, an average temperature differential, or an average rise rate.

19. The controller of claim 17, wherein the controller uses Boolean logic to detect the fire condition and activate the fire suppression system.

20. The controller of claim 17, wherein the controller is configured to wirelessly communicate with a remote device and receive an update from the remote device, wherein the update comprises one or more parameters used to detect the fire, or the one or more characteristic values.

* * * * *